United States Patent
Irwin et al.

(10) Patent No.: US 11,995,625 B1
(45) Date of Patent: *May 28, 2024

(54) SYSTEM AND METHOD FOR FEDERATED RIGHTS MANAGEMENT

(71) Applicant: Netcracker Technology Solutions LLC., Cincinnati, OH (US)

(72) Inventors: Scott Andrew Irwin, Winter Springs, FL (US); Robert Dennis Birch, Orlando, FL (US); Joseph Paul Lupo, Apopka, FL (US); Stephen DeWayne Weagraff, Orlando, FL (US)

(73) Assignee: NETCRACKER TECHNOLOGY SOLUTIONS, LLC., Cincinnati, OH (US)

( * ) Notice: Subject to any disclaimer, the term of this patent is extended or adjusted under 35 U.S.C. 154(b) by 110 days.

This patent is subject to a terminal disclaimer.

(21) Appl. No.: 15/082,678

(22) Filed: Mar. 28, 2016

Related U.S. Application Data

(63) Continuation of application No. 12/124,693, filed on May 21, 2008, now abandoned, which is a
(Continued)

(51) Int. Cl.
*G06Q 20/12* (2012.01)
*G06F 21/10* (2013.01)
(Continued)

(52) U.S. Cl.
CPC ....... *G06Q 20/1235* (2013.01); *G06F 21/105* (2013.01); *G06Q 50/184* (2013.01);
(Continued)

(58) Field of Classification Search
CPC ............ G06Q 50/184; G06Q 2220/18; G06Q 20/1235; H04L 63/0435; H04L 9/083;
(Continued)

(56) References Cited

U.S. PATENT DOCUMENTS

| | | |
|---|---|---|
| 4,658,093 A | 4/1987 | Hellman |
| 4,953,209 A | 8/1990 | Ryder et al. |

(Continued)

FOREIGN PATENT DOCUMENTS

| | | |
|---|---|---|
| WO | WO-02/09044 A1 | 1/2002 |
| WO | WO-02/37210 A2 | 5/2002 |
| WO | WO-02/54196 A2 | 7/2002 |

OTHER PUBLICATIONS

Chang et. al; "Multimedia Rights Management for the Multiple Devices of End-User"; 23rd International Conference on Distributed Computing Systems Workshops, 2003. Proceedings., 2003, pp. 640-645.*

(Continued)

*Primary Examiner* — Steven S Kim
(74) *Attorney, Agent, or Firm* — FOLEY & LARDNER LLP

(57) ABSTRACT

A system is disclosed for a digital rights management system which enforces license rights by establishing an account domain of registered consumer devices which may each receive a decryption key to be used to decode digital content bought by any of the devices within the account domain. Such system further enables the decentralization of content sharing by establishing a network of trusted intermediate devices to manage licenses on end devices for a central rights provider.

2 Claims, 9 Drawing Sheets

Related U.S. Application Data continuation of application No. 10/671,396, filed on Sep. 25, 2003, now Pat. No. 7,389,273.

(51) Int. Cl.
  *G06Q 50/18* (2012.01)
  *H04L 9/08* (2006.01)
  *H04L 9/40* (2022.01)

(52) U.S. Cl.
  CPC ............ *H04L 9/0825* (2013.01); *H04L 9/083* (2013.01); *H04L 63/0435* (2013.01); *H04L 63/0442* (2013.01); *G06Q 2220/18* (2013.01); *H04L 2209/603* (2013.01); *H04L 2463/101* (2013.01)

(58) Field of Classification Search
  CPC ............ H04L 9/0825; H04L 2209/603; H04L 2463/101; H04L 63/0442; G06F 21/105
  See application file for complete search history.

(56) References Cited

U.S. PATENT DOCUMENTS

| | | | |
|---|---|---|---|
| 4,999,806 | A | 3/1991 | Chernow et al. |
| 5,191,573 | A | 3/1993 | Hair |
| 5,375,240 | A | 12/1994 | Grundy |
| 5,502,766 | A | 3/1996 | Boebert et al. |
| 5,563,946 | A | 10/1996 | Cooper et al. |
| 5,671,412 | A * | 9/1997 | Christiano ............ G06Q 30/04 |
| 5,715,403 | A | 2/1998 | Stefik |
| 5,790,664 | A * | 8/1998 | Coley .................... G06F 21/10 709/203 |
| 5,864,620 | A | 1/1999 | Pettitt |
| 5,892,899 | A | 4/1999 | Aucsmith et al. |
| 5,892,900 | A * | 4/1999 | Ginter .................... G06Q 20/12 726/26 |
| 5,920,700 | A | 7/1999 | Gordon et al. |
| 5,925,127 | A | 7/1999 | Ahmad |
| 5,931,901 | A | 8/1999 | Wolfe et al. |
| 6,009,401 | A | 12/1999 | Horstmann |
| 6,044,469 | A | 3/2000 | Horstmann |
| 6,056,786 | A | 5/2000 | Rivera et al. |
| 6,112,192 | A | 8/2000 | Capek |
| 6,169,976 | B1 | 1/2001 | Colosso |
| 6,170,014 | B1 | 1/2001 | Darago et al. |
| 6,226,618 | B1 | 5/2001 | Down et al. |
| 6,236,971 | B1 | 5/2001 | Stefik et al. |
| 6,282,653 | B1 | 8/2001 | Berstis et al. |
| 6,289,450 | B1 | 9/2001 | Pensak et al. |
| 6,314,409 | B2 | 11/2001 | Schneck et al. |
| 6,330,670 | B1 | 12/2001 | England et al. |
| 6,363,357 | B1 | 3/2002 | Rosenberg et al. |
| 6,385,596 | B1 | 5/2002 | Wiser et al. |
| 6,418,412 | B1 | 7/2002 | Hurtado et al. |
| 6,438,235 | B2 | 8/2002 | Simms, III |
| 6,510,513 | B1 | 1/2003 | Danieli |
| 6,766,305 | B1 | 7/2004 | Fucarile et al. |
| 6,810,389 | B1 | 10/2004 | Meyer |
| 6,928,419 | B2 * | 8/2005 | Stefik .................... G06F 21/10 705/51 |
| 7,103,663 | B2 | 9/2006 | Inoue et al. |
| 7,185,363 | B1 | 2/2007 | Narin et al. |
| 7,389,273 | B2 * | 6/2008 | Irwin .................... H04L 9/0825 705/51 |
| 7,747,533 | B2 | 6/2010 | Zhang et al. |
| 2002/0049679 | A1 | 4/2002 | Russell et al. |
| 2002/0059144 | A1 | 5/2002 | Meffert et al. |
| 2002/0077988 | A1 | 6/2002 | Sasaki et al. |
| 2002/0104019 | A1 | 8/2002 | Chatani et al. |
| 2002/0107802 | A1 | 8/2002 | Philips |
| 2002/0128842 | A1 * | 9/2002 | Hoi ........................ G06Q 30/02 704/260 |
| 2002/0138744 | A1 | 9/2002 | Schieicher et al. |
| 2002/0157002 | A1 * | 10/2002 | Messerges ......... H04N 21/8355 380/279 |
| 2003/0005135 | A1 * | 1/2003 | Inoue ...................... G06F 21/10 709/229 |
| 2003/0140003 | A1 * | 7/2003 | Wang ..................... G06Q 20/10 705/39 |
| 2005/0044016 | A1 * | 2/2005 | Irwin .................... G06Q 20/367 705/30 |
| 2005/0210261 | A1 * | 9/2005 | Kamperman ...... H04N 21/4367 713/182 |
| 2005/0273862 | A1 | 12/2005 | Benaloh et al. |
| 2008/0133716 | A1 * | 6/2008 | Rao ........................ H04L 67/306 709/227 |
| 2010/0161974 | A1 * | 6/2010 | Lee ........................ G06Q 10/10 380/279 |

OTHER PUBLICATIONS

Webb. "Music For Rent." www.washingtonpost.com/wp-dyn/articles/A62329-2004May3.html, printed May 3, 2004.
SDMI Portable Device Specification, Part 1, Version 1.0, Jul. 8, 1999.
Digital Music Distribution, http://www.teamcombooks.com/mp3handbook/4.htm, visited Oct. 2, 2002.
New Encryption System Would Protect Digital Music, http://www.shmoo.com/maiVcypherpunks/jul00/msg00023 .shtml, visited Oct. 2, 2002.
ViaTech Technologies, Inc.—Music, http://www.elicense.com/what/music.asp, visited Oct. 2, 2002.
Sony.com: http://www.sony.com/cgi- bin/pf.cgi?page=SCNpress/990225.shtml, visited Oct. 2, 2002.
Architecture of DRM—Windows Media Technologies: http://www.microsoft.com./windows/windowsmedia/wm7/drm/arc hitecture.asp, visited Oct. 2, 2002.
New Scientist, http://www.newscientist.com/news/news.jsp?id=ns99993 793, visited Jun. 4, 2003.
Open Digital Rights Language (ODRL) Version I.; http://www.w3.org/TR/2002/NOTE-odrl-20020919/, visited Sep. 9, 2003.
The Digital Object Identifier System; http://www.doi.org/, visited Sep. 9, 2003.
XrML . . . extensible rights Markup Language; The Digital Rights Language for Trusted Content and Services; http://www.xrml.org/, visited Sep. 9, 2003.
Open Mobile Alliance; http://www.openmobilealliance.org/, visited Sep. 9, 2003.
SDMI—Home; The Secure Digital Music Initiative; http://www.sdmi.org/, visited Sep. 9, 2003.
Protecting Digital Content using Cloakware Code Transformation Technology; http://www.cloakware.com/pdfs/Protecting%20Digital%20Conten t%2005-02.pdf, visited Sep. 9, 2003.
Trusted Computing Platform Alliance; http://www.trustedcomputing.org/home, visited Sep. 9, 2003.
Client Security Solutions from IBM; http://ww5.pc.ibm.com/us/me.nsf/webdocs/White+Paper: Client+Security+Solutions+from+IBM:English/$FILE/gk205858.pdf, visited Sep. 9, 2003.
Developing a License Provider Service for Windows Media Encoder; http://msdn.microsoft.com/library/default/asp?url=/library/en- us/dnwmt/htmVdrmencoder.asp, visited Sep. 9, 2003.
Electronic Media Management System (EMMS); http://www- 3.ibm.com/software/data/emms/, visited Sep. 9, 2003.
InterTrust Technologies; RightsjSystem; http://www.intertrust.com/main/technology/index.html, visited Sep. 9, 2003.
RealNetworks.com > Products & Services; Start Utilizing the Power of Helix; http://www.realnetworks.com/products/, visited Sep. 9, 2003.
"SmartRight Technical White Paper", Oct. 29, 2001, (Jan. 2003); http://www.smartright.org/images/SMR/content/SmartRight_tech_whitepaperjan28.pdf.
Digital Rights Management Business and Technology; by Bill Rosenblatt, Bill Trippe and Stephen Mooney; M&T Books 2002.
Java Card Technology for Smart Cards Architecture and Programmer's Guide; by Zhinqun Chen; Addison-Wesley 2000.
Java Security; by Schott O s; O'Reilly 1998.

* cited by examiner

| Key Name | Key Type | Generated By / When | Provided To | Purpose |
|---|---|---|---|---|
| Device Key | Asym | SC Manufacturer Signed by CA / Smart Card Personalization | LRP (Certificate Only) | - Register Device to LRP<br>- Encrypt / Sign messages with LRP<br>- Access Device Package |
| LRP Key | Asym | SC Manufacturer Signed by CA / Smart Card Personalization | CRP (Certificate Only) | - Register Device to CRP<br>- Encrypt / Sign messages with CRP |
| DBR Key | Sym | CRP or DBR System / Account Sign-Up | LRP<br>LRP distributes to other Consumer Devices | - Encryption processing of DBR state data in FDR Key |
| Account Key | Sym | CRP / Account Sign-Up | LRP<br>LRP distributes to other Consumer Devices | - Encryption processing of FRM Keys |
| Content Key | Any | Content Provider / Pre-release of content | CRP<br>CRP distributes to LRP, LRP packages into FRM Key | - Decrypt digital content |
| FRM Key | N/A | LRP / After purchase of content and Content Key provided by CRP | Registered Devices | - Wrapping Content Key requiring correct Account Key, DRE Key and Private Device Key to access Content Key |

Figure 6

SYSTEM AND METHOD FOR FEDERATED RIGHTS MANAGEMENT

CROSS REFERENCE TO RELATED APPLICATION

This application is a Continuation Application of U.S. patent application Ser. No. 10/671,396 entitled SYSTEM AND METHOD For SYSTEM AND METHOD FOR FEDERATED RIGHTS MANAGEMENT, filed on Sep. 25, 2003, the disclosure of which is incorporated herein by reference.

FIELD OF THE INVENTION

The present invention relates generally to protecting digital information from mass, free distribution while allowing an authorized user to utilize said information on a variety of devices.

BACKGROUND

The term "Digital Rights Management" (DRM) encompasses the management of legal rights for business and commercial purposes, including tracking those rights, rightsholders, licenses, sales, agents, royalties and their associated terms and conditions, in the digital age. Some definitions follow.

Rights are the privileges, to which one is justly entitled, to perform some action involving the intellectual property of some entity.

A Content Owner is a legal entity that owns the rights in some intellectual property by virtue of a copyright, trademark, patent and so on. These rightsholders may enter into legal arrangements whereby they either sell or license those rights or subset of rights to another party.

A User/Licensee is the legal entity that has licensed rights for some type of content.

A Rights Transaction includes the act of legally transferring rights from one entity to another.

An Agent is a legal entity that has been granted authority by a Content Owner to perform rights transactions with other parties in the interests of the rightsholder.

Royalties are the monetary compensation paid to a Content Owner associated with a rights transaction.

Utility Rights allow the necessary functionality to maintain the user's collection of digital content files and their associated rights files (e.g., the right to backup and restore content files to the original device; data integrity rights, which permit the creation of error correcting/detecting codes and checksums; and caching rights to duplicate the content on many servers for the performance of their distribution process).

Prior to the wide spread popularity of the Internet, content was physically distributed and therefore carried a set of implicit rights. A customer could purchase an album from the record store, which obtained consideration, for album rights owners, in the form of the customer's money.

Rights models require more information than just the type of rights that have been granted to a user for a particular instance of content. For each right granted, there are express limitations, qualifications and/or compensation for the use of those rights.

Attributes

The consideration attribute declares the necessary compensation required in return for utilizing the associated right. Typically the consideration is monetary, but could also take any other form relevant to the content owner. For example, the user may be required to provide relevant demographics or participate in a survey.

The extent of the right declares information such as how many times, for how long, during what periods or in what locations the right is valid. For example, a user might have purchased the right to play a video five times, or all weekend, or is only permitted to view a sampling of the video. In another example, a user of an e-book article might have the right to view the content unlimited times, but can only print the content twice.

Another major attribute category is the type of user attribute, which provides the ability to group rights into different categories and grant those sets of rights to different users based on their user type. A user authenticated as a valid agent might have the "copy" right of a movie, while another user only has the "view" right.

Business Models

Paid Downloads

The paid download model was the original DRM business model. Customers could enter a provider's website, shop for content, enter their credit card and, after validation, download their requested content. This interaction model is similar to the business model where the consumer enters a store and immediately pays for some item. DRM systems can enforce the rights purchased by the consumer once the content is resident on the consumer's device. Often, however, purchasing the content is too complex for consumers. Also, many consumers do not want to be tethered to their PC while viewing or playing content.

Subscriptions

In the subscription model, the consumer creates an account on the provider's website and typically picks a specific price plan. The plans offered by the provider allow the consumer to acquire a given set of rights for a predetermined period of time for content offered through the provider's website. The DRM system on the client enforces the rights allowed by the subscription that the consumer has purchased. A subscription might allow a certain number of plays under the flat fee subscription. If the user exceeds their limit, the additional accesses are rated on a per-usage basis.

Pay-Per-Access

The pay-per-access business model has two forms: pay-per-view and pay-per-listen. None, of the current set of DRM solutions, offer the processing micropayments.

Superdistribution

Superdistribution allows the rights associated with content to be passed along to additional users while still honoring the considerations associated with the rights.

The physical distribution, of content and the associated rights, has two fundamental models. In one case, the rights and content are conjoined entities and cannot be separated. As conjoined entities, these distributions are packaged and valid only for each individual device that purchases the content. The second fundamental model of distribution separates the rights and content into their respective parts. The rights are packaged into a file termed the license document.

The rights associated with content in a superdistribution model must specify what a consumer can do with the content after they have bought those rights, including the set of rights that may be passed along to the next user along with any additional limitations and considerations.

Referring to FIG. 1, most production DRM systems (100) follow the architectural pattern which supports the separate distribution of the rights document (162). The architecture comprises: the content server (120), the license server (160)

and the client device (140). Each of these components collaborates with each other to complete the DRM (100) implementation.

The content server (120) has the responsibility of making this digital content (142) available for download to devices (140) participating in the DRM arrangement. The content server (120) also has the responsibility of cataloging the available content and providing some type of registry that allows potential consumers to navigate a list of available content for download. The registry might contain descriptions of the content as well as marketing information. The content server is preferably locatable so the client can obtain the package content in the first place. The final responsibility of the content server (120) is to create a set of rights documents (162) that the rightsholder will grant to users of the content (142). These rights documents (162) might also contain the compensation metadata associated with the various rights. The content server (120) may update the rights documents (162) that are to be offered to clients, as well as change the encryption information for a piece of content.

The license server's (160) primary responsibility is to package the appropriate rights document (162) with the appropriate decryption key for the requested content (142), and provide that packaged license to the client device. In order to authenticate clients, the license server (160) may also process encryption key(s) and certificate(s) presented by the client device (140). The license server (160) may also collaborate with the content server (120) to obtain updates about new and existing registered content.

The client device (140) has the responsibilities of authenticating the current device user, acquiring content, requesting licenses from the license server (160) and finally adhering to the policies of the rights document (162). The client device (140) may also create a local repository (148) of existing licenses that have been acquired in the past which a DRM controller may access after the user has been authenticated. Once all of the DRM functionality has been taken care of, the client device (140) can also render the content. A DRM controller (146) performs its authorization of the requested rights, and, if successful, decrypts the restricted content so that the rendering application (144) can access the content (142). If the rights have expired or the license document was not found in the local repository (148), the DRM Controller (146) can then collaborate with the license server (160) to acquire a new rights document (162).

Identifiers

It is preferable that all DRM systems have the capability to uniquely identify a piece of content. One promising standard in this area is the Digital Object Identifier (DOI). The DOI standard stems from the Association of American Publishers (AAP) work on their online copyright management initiative. A DOI is analogous to a web Uniform Resource Locator (URL) using a Domain Name Server (DNS) to resolve the true Internet Protocol (IP) address of the resource.

Language

The second important standards area relevant to the invention governs the rights document structure. One of the most complete standards for expressing rights within an XML document is the Extensible Rights Markup Language (XrML) standard. The current release of the specification is XrML 2.0. XrML defines two security concepts: issuer and trusted Principal. These allow the definition of licenses that specify the right to issue other licenses.

Digital Property Rights Language (DPRL) also focuses on the concept of trusted systems, which can render content according to a precise definition.

Security

The main objective of incorporating cryptography in a DRM solution is to prevent the content from being accessed outside the control of the DRM solution. When the key value used to encrypt and decrypt the data is the same value, a symmetric key algorithm is being used. DES, Triple DES, RC4, RC5 and RC6 are common symmetric algorithms. In the asymmetric encryption model, two different keys (public and private) are used to perform the encryption process. In order to determine the authenticity of the origins of a public key, a Certificate and Certificate Authority come into play. A certificate encapsulates the public key and some description information about the sender. A certificate authority is a well known entity such as the RSA security company. Certificates can be chained together to form a linked list of trust.

Other security measures include message digests, digital signatures, smart cards and code obfuscation.

Trusted Environment

The computing industry has awakened to the need of a distributed computing environment where software providers can be assured that their software will not be altered, examined or spoofed by other software and hardware components. Industry consortiums, such as the Trusted Computing Platform Alliance (TCPA), and individual hardware manufactures, such as IBM and Texas Instruments, are currently delivering specifications, chips and peripherals that support this type of trusted environment.

SUMMARY OF THE INVENTION

The Federated Rights Management System (FRMS) is an extension of the typical Digital Rights Management System (DRM) reference model. In order to fully understand the impact of the FRMS on the DRM industry, the reader must have a general understanding of DRM, cryptographic processing, and the to secure digital content. The invention also relies on the emerging discipline of trusted computing platforms.

FRMS builds on a key licensing structure that binds the rights to a specific user and set of user devices. FRMS business models discuss how the new DRM would flow during the purchase of rights, the management of consumer devices and their licenses, and how a Device Based Rating component (such as that offered by Convergys, Inc.) integrates into the FRMS.

Consumer to Internet Retailer

In this model, a consumer has a collection of devices capable of processing digital content. The consumer obtains the digital content by interacting with one or more content providers over the Internet.

Paid Downloads: Embodiments of the invention address the limitations of the paid download business model. The invention has the capability to streamline the purchasing process by incorporating a trusted third party to mediate the settlement of content, whereby the consumer doesn't have to have a relationship with every site. The invention also simplifies the consumer's DRM experience and enables a simple distribution of the user's rights to content among their personal devices. The FRMS also provides the mechanism to control the distribution of DRM licenses throughout the consumer's network of devices. The FDR Key can be conveyed from one device to another in accordance with the rights purchased, as simply as bringing the second device into the Bluetooth proximity of the first device. Finally, the invention provides for the DRM incorporation of Convergys' Device Based Rating component, which handles the micropayments on the device.

Subscriptions: Embodiments of the invention provide the mechanism that will allow the consumers to distribute their subscription rights to all of their personal devices. By incorporating the Convergys Device Based Rating component, the type of subscriptions offered on the consumer's devices can be greatly expanded.

During a subscription period (i.e., at the end of the period or some other predetermined time), these extra devices may be networked to the consumer's Local Rights Provider (LRP) to revalidate the subscription was paid for the next period.

If the FRMS is deployed in combination with the DBR component, the subscription model can be altered from focusing on the number of downloads, to focusing on the number of accesses. In this way, a consumer can download a larger library of content and cache them on their devices. Subscription usage occurs when they access the content. Usage information from all of the consumer's devices can be aggregated back at the LRP for processing, for example, to apply volume discounts based on usage spanning the user's devices.

Pay-per-access: Embodiments of the invention have the capability to streamline the purchasing process by incorporating a trusted third party to mediate the settlement of content, whereby the consumer doesn't have to have a relationship with every site. By incorporating a Device Based Rating component, the pay-per-access model can be enhanced by adding various pricing models based on consumer usage.

Embodiments of the invention further provide a platform for collecting and aggregating usage information across all of the consumer's devices. As content is dispersed across a consumer's set of devices, the invention provides a way to retrieve the distributed usage information. When combined with a Device Based Rating component, the invention could offer discounts across the consumer's devices for those users that want to participate in the marketing analysis.

In one embodiment, an electronic system (involving computers or computerized equipment or any equipment capable of electronic communication with another piece of equipment and, possibly, the Internet) for managing distribution (sharing, loaning, and new licenses thereof) of digital content (any content capable of being reduced to digital format including movies, audio files, pictures, and more) comprises an electronic central rights provider (a central server which may manage only licensing and/or maintenance of the digital content); an electronic intermediate rights provider; and at least one electronic consumer device (i.e., a computer, TV, cable set-top box, MP3 player, handheld video game, PDA and more). The central rights provider may be configured (through programming either via software, hardware, firmware, etc.) to grant and transmit an electronic master license (a master document outlining the rights the intermediate rights provider has with regard to redistribution of content) to said intermediate rights provider (the LRP, a kiosk or a trusted consumer device) wherein said master license includes a right to create a child license (a license whose rights depend from the master grant) for a set of digital content associated with said master license. The intermediate rights provider may be configured to establish an account domain comprising at least said consumer device wherein said consumer device registers (registered consumer device) by transmitting an identifier (such as the device ID or any other identifier which may uniquely identify the particular piece of equipment) and a set of security credentials (such as an FRM Certificate or equivalents thereof) to said intermediate rights provider. The intermediate rights provider may be configured to create and transmit (via any number of electronic mediums including hardwire and wireless technologies) a unique account key (an encryption code which may include both symmetric and asymmetric code or other equivalents thereof) to each of said registered consumer devices in a given account domain. The intermediate rights provider may be configured to receive a request for a set of digital content from a first registered consumer device. The intermediate rights provider may be configured to create an electronic child license according to said request and within a set of parameters dictated by said master license (the master license may grant rights not available to the LRP or a subset thereof). The intermediate rights provider may be configured to combine at least said child license, a set of account data associated with said first registered device (i.e., credit card number, prepaid account number, name of customer) requesting content (requesting device), and said digital content in a digital rights package. The intermediate rights provider may be configured to encrypt said digital rights package (encrypted package) by using said account key. The intermediate rights provider may be configured to transmit said encrypted package to said requesting device. The intermediate rights provider may be configured to process a charge associated with said request using said account data associated with said requesting device. The intermediate rights provider may be configured to transmit a set of settlement data associated with said charge to said central rights provider.

In another embodiment there may be an electronic system for managing distribution of digital content wherein said requesting device may be equipped with a digital rights management system (programming via hardware, software, or firmware which interprets the rights document/FDR Key/child license) which may be configured to use said account key to decrypt said encrypted package and utilize said digital content.

In another embodiment, there may be an electronic system for managing distribution of digital content wherein the requesting device's digital rights management system may be further configured to transmit said encrypted package to a second consumer device. This may constitute the loaning or sharing applications of the system.

In another embodiment, an electronic system for managing distribution of digital content may include, if said second consumer device is a registered device in the same account domain as said requesting device, a digital rights management system embedded into said second consumer device that may be configured to decrypt said encrypted package using said account key obtained at registration. Basically, here, the second device in the Account Domain is able to open the same license package using the Account Key it received at registration. In this way, all of a consumer's devices may easily have access to a particular piece of content.

In another embodiment, an electronic system for managing distribution of digital content may include, if said second consumer device is not a registered device in the same account domain as said requesting device, a second consumer device configured to either (a) communicate with said intermediate rights provider to join said account domain, or (b) communicate with said intermediate rights provider to establish a new account domain and receive an account key associated with said new account domain.

In another embodiment, an electronic system for managing distribution of digital content may include an intermediate rights provider which may be configured to update said encrypted package transferred to said second consumer device by deleting said account information associated with said requesting device and inserting account information associated with said second consumer device.

In another embodiment, an electronic system for managing distribution of digital content may include consumer devices that may be configured to request a set of additional license rights from said intermediate rights provider.

In another embodiment, an electronic system for managing distribution of digital content may include an intermediate rights provider further configured to process a charge for said set of additional license rights using said account data associated with said consumer devices and according to a set of formulas included in said master license.

In another embodiment, an electronic system for managing distribution of digital content may include an intermediate rights provider further configured to transmit a set of settlement data associated with said charge to said central rights provider.

In another embodiment, an electronic system for managing distribution of digital content may include, if said child license generated by said intermediate rights provider is usage-based, the requesting device's digital rights management system configured to transmit said encrypted package to second consumer device and to turn off said child license within said requesting device until such time as the child license is returned to the requesting device.

In another embodiment, an electronic system for managing distribution of digital content comprises a digital rights management system which is configured to transmit said encrypted package to a foreign consumer device and to substantially contemporaneously turn off said child license within said requesting device. This embodiment addresses a scenario which may exist whether an account domain has been established or not but in which the initial device which has paid for a set of rights wishes to either sell those rights or give those rights away to a user who is not part of their account domain (foreign consumer device). This scenario contemplates a variety of means for exchanging money including the selling of rights via an auction site on the Internet and facilitating actual payment through those means. In this scenario, the intermediate rights provider or LRP may not be forwarding settlement information back to the central rights provider but they may forward certain information regarding the new owner for tracking purposes. Substantially contemporaneously here should be taken to include exactly or within industry standards of facilitating such computer transactions.

In another embodiment, an electronic system for managing distribution of digital content may include the central rights provider further configured to record a bonus to be associated with said intermediate rights provider for processing said request.

In another embodiment, a method of delegating the distribution of content and licenses among a plurality of consumer devices (that is, transferring the responsibility for a centralized rights provider to manage all of the licenses for a set of digital content and decentralizing this management though one or more local nodes) may include the steps of receiving, from said central rights provider, an electronic master package comprising a set of digital content and an electronic master license to govern a set of distribution rights via an intermediate rights provider from a central rights provider. It may further include the step of receiving and processing, at said intermediate rights provider, a registration from at least one consumer device in electronic communication with said intermediate rights provider. It may further include the step of electronically sending, from said intermediate rights provider, an account key to each of a set of consumer devices registering under a single account. It may further include the step of receiving and processing, at said intermediate rights provider, a request, from one of said consumer devices, for a child license to said set of digital content. It may further include the step of preparing, at said intermediate rights provider, a digital rights package comprising said digital content; a child license, structured within said request and a set of parameters contained in said master license; and account data associated with said consumer device wherein said package is encrypted using said account key. It may also include the step of electronically transmitting, from said intermediate rights provider, said digital rights package to said consumer device.

In another embodiment, there may be a multi-processor system comprising a plurality of processor means (computerized devices, media devices, and equivalents thereof) for managing distribution of digital content wherein a first electronic rights provider is configured to create and transmit an electronic master license to a second electronic rights provider. The master license grants to the second electronic rights provider a right to create at least one child license for a set of digital content associated with the master license within a set of parameters defined by said master license. The second electronic rights provider may be configured to grant said child license to an electronic media device; process a charge associated with said child license using a set of account data associated with said media device; and transmit a set of settlement data associated with said charge to said first rights provider.

In another embodiment, there may be a computer-readable medium (any kind of computer memory including but not limited to floppy disks, conventional hard disks, CD-ROMS, Flash ROMS, nonvolatile ROM, RAM, and equivalents thereof) having computer-executable instructions for delegating the distribution of content and licenses among a plurality of consumer device configured to electronically receive an electronic master package comprising a set of digital content and an electronic master license wherein said master license is encoded with a set of distribution rights for said digital content; create at least one electronic child license in response to an electronic request from a consumer device for said digital content wherein said child license complies with said distribution rights; encrypt said child license; and electronically sending said child license to said consumer device.

In another embodiment, there may be an electronic system for managing distribution of digital content comprising an electronic central rights provider; an electronic intermediate rights provider; at least one electronic consumer device. The central rights provider may be configured to grant and transmit an electronic master license to said intermediate rights provider wherein said master license includes a right to create a child license for a set of digital content associated with said master license for transmission to said at least one electronic consumer device. The intermediate rights provider (first intermediate rights provider) may be further configured to request at least one child license from a second intermediate rights provider.

Furthermore, the first intermediate rights provider may be further configured to combine said at least one child license, a set of account data associated with at least one electronic consumer device that has registered with said first intermediate rights provider (registered electronic consumer device) and requested said child license, and a set of digital content associated with said child license in a digital rights package. The first intermediate rights provider may be configured to encrypt said digital rights package (encrypted package) by using an account key associated with said at least one registered electronic consumer device. Finally, the first intermediate rights provider may be configured to transmit said encrypted package to said registered electronic consumer device.

In another embodiment, the intermediate rights provider (first intermediate rights provider) is further configured to export said child license to a second, trusted, foreign system if permitted by said master license. This allows the interoperability of different DRM systems.

An electronic system for managing distribution of digital content may be further configured so that the intermediate rights provider (first intermediate rights provider) may import a foreign child license from a foreign system and use said foreign child license to create a digital rights package for distribution to said electronic consumer device that has registered with said intermediate rights provider.

An electronic system for managing distribution of digital content including at least two registered consumer devices (a first registered consumer device and a second registered consumer device) may provide a license synchronization function. The intermediate rights provider may be configured to maintain a list of child licenses purchased by said registered consumer devices in said account domain. The first registered consumer device may purchase and receive said digital rights package. The second registered consumer device may attempt to utilize content associated with said digital rights package without said child license. The second registered consumer device may electronically query said intermediate rights provider to determine if said child license has been purchased by another registered consumer device in said account domain. If said child license has been purchased by another registered consumer device in said account domain, then said intermediate rights provider may transmit said digital rights package to said second registered consumer device.

BRIEF DESCRIPTION OF THE DRAWINGS

FIG. 6 outlines a set of encryption keys that may be used within FRMS.

DETAILED DESCRIPTION OF THE INVENTION

Typical Interaction Model

Figure 1:
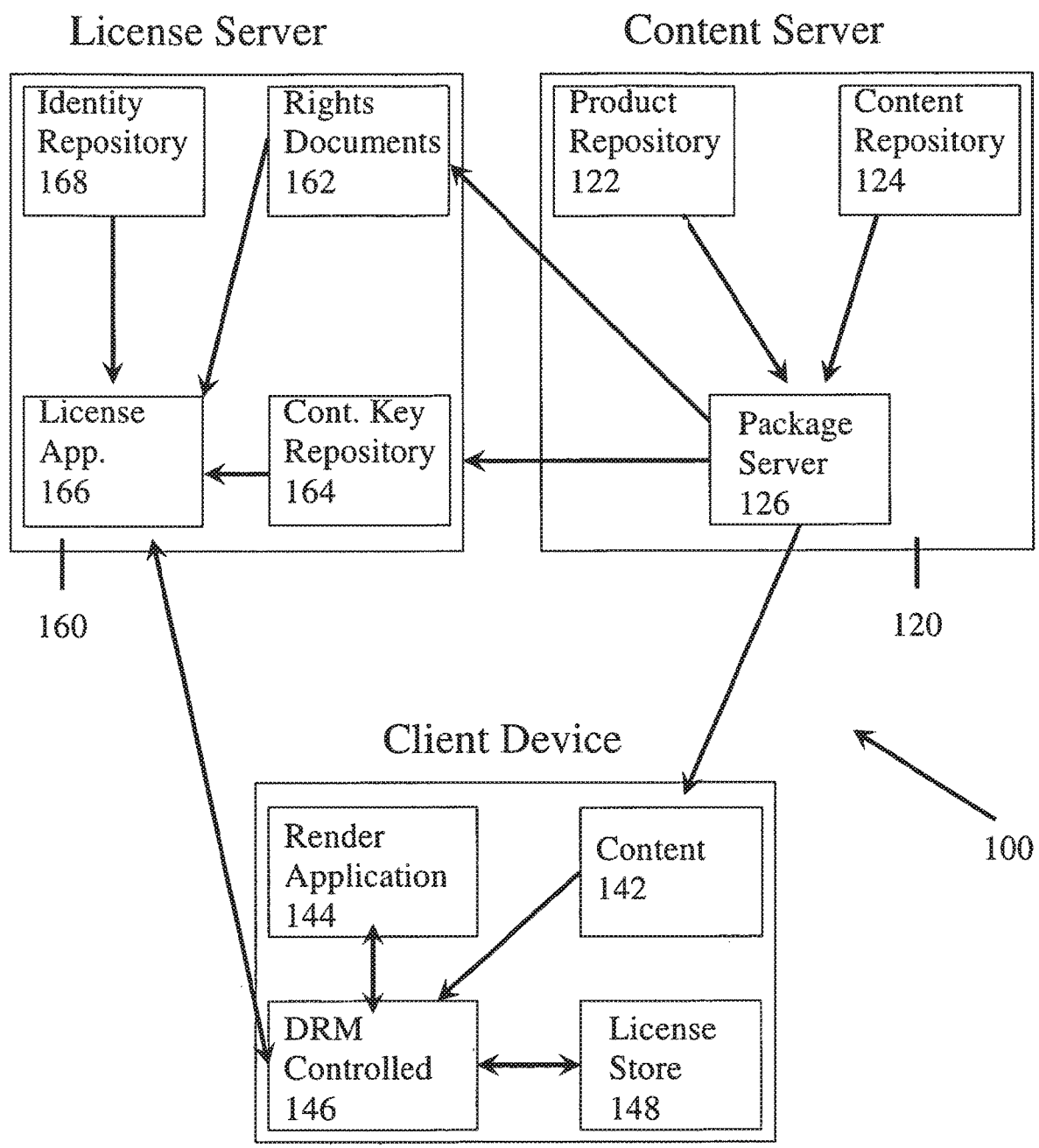
FIG. 1 illustrates an embodiment of a DRM system.
Figure 2:
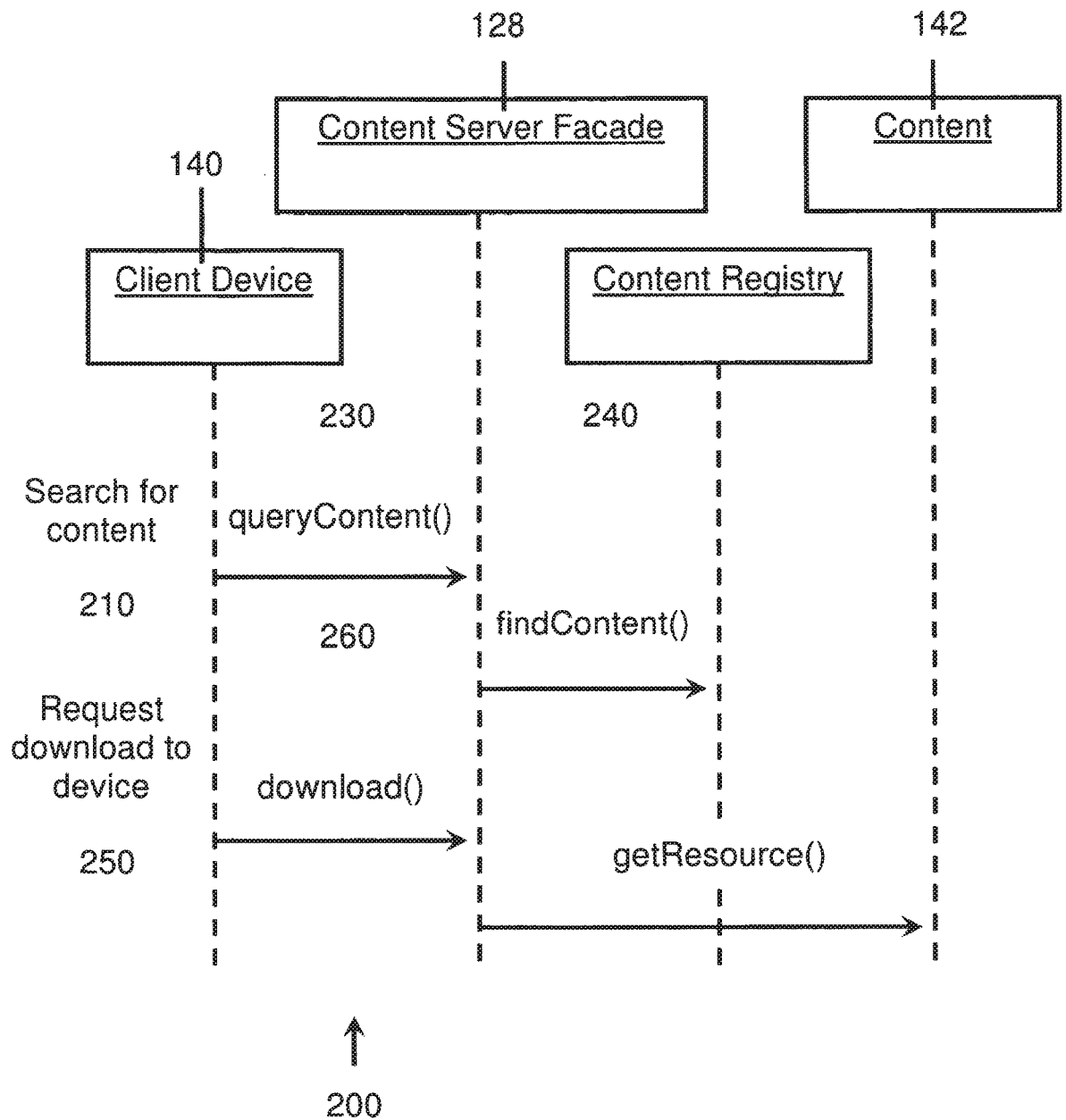
FIG. 2 depicts a UML diagram for accessing content from an embodiment of the invention.

Because the current invention builds on existing DRM technology, certain steps in the following interaction may appear familiar. In the typical interaction (200), the process starts by the client device (140) acquiring the content (142). In the superdistribution model, the content (142) can be acquired from many sources. The client device (140) may search (210) the content server (120) for content (142) via the content provider's web site depicted here as the Content Server Façade (128) by genre, title, author, etc. In the peer-to-peer world, this could, for example, be accomplished using the popular Morpheus file sharing software or equivalents thereof.

The content server (120) searches (240) its repository (124) of content (142) looking for likely matches. The results are returned to the client device (140). The client device (140) may choose (250) one or more of the results for download. Once the items have been selected, the content server (120) can download (260) the DRM restricted content files down to the device (140).

The content server (120) may have additional responsibility to evaluate the number of downloads remaining that the client is authorized to obtain for some given subscription duration.

The content server (120) may also have to dynamically prepare the content (142) for the client device (140) on the fly in various formats and channels to serve many types of clients that may require different distribution requirements. A publisher client may have a different distribution channel than a client using the DRM system to view the content over the web.

Figure 3:
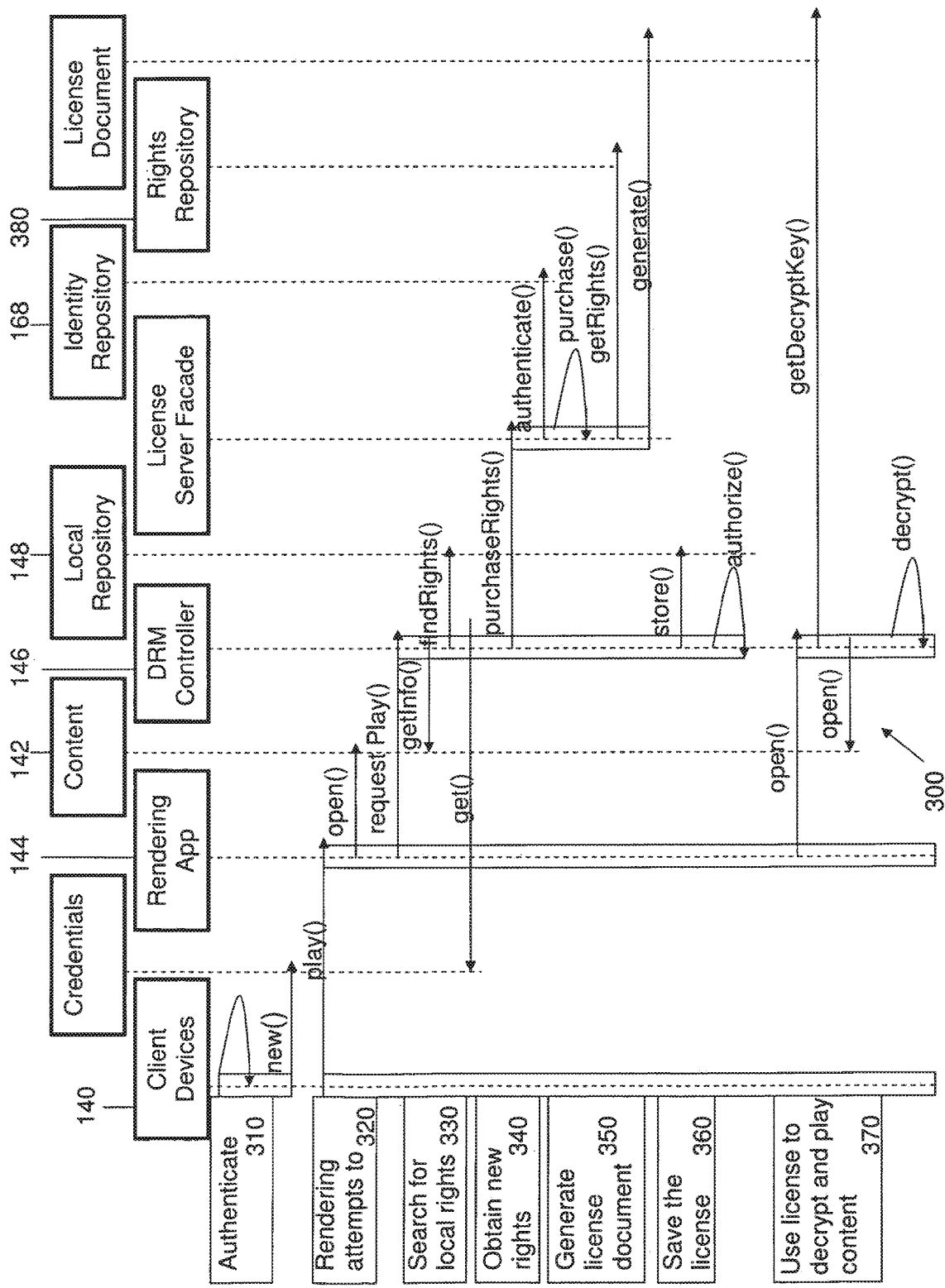
FIG. 3 depicts a UML diagram of a typical interaction of an embodiment of FRMS.

Referring to FIG. 3, the client user may be authenticated (310) to the device in some fashion acceptable to the DRM controller (146) (e.g., sign-on, PIN, biometrics, etc.).

The license server (160) interaction starts when the client device (140) user attempts to access (320) the DRM restricted content (142) file typically using some type of rendering software (144). When the rendering software (144) accesses the file header information, it detects that the content (142) file is DRM restricted and then delegates the access to a resident DRM controller (146) plug-in.

The DRM controller (146) examines the header information of the content file to obtain the unique identifier of the content (142). This Content ID is used to associate the appropriate license document. The DRM controller (146) first examines its own local registry (148) of license documents obtained from prior requests (330). If the local repository (148) has the appropriate license document that matches the content's (142) unique identifier, that license document is used to determine the user's granted content rights. However, if the local registry (148) doesn't contain the correct license document, the DRM controller (146) will attempt to connect to the appropriate license server (160).

The DRM controller (146) at this point may obtain a license for the content (340). The controller can perform this task in the background, or prompt the user along the way with various rights/considerations models. Before the DRM controller (146) contacts the license server (160), it must acquire the credentials of the user at some point. This information is passed to the license server (160) to authenticate the remote client(140) to the license server (160). Once authenticated based on the passed credentials, the license server (160) is ready to process the client request.

Based on the requested rights being purchased, the license server (160) creates or selects the corresponding rights document from a Repository of Rights (380). The rights document (162) and the appropriate decryption key for the content (142) are packaged (350) into a license document that can be securely transmitted down to the client device (140). The client device (140) may provide their public key as part of their credentials, which is used to encrypt the license key for secure transmission.

Once the license has been returned to the client DRM controller (146), it is stored (360) within the local repository (148) for future access. Now that a license document has been acquired, the DRM controller (146) can attempt to validate the original rendering request. The rights document within the license document is checked for the appropriate rights and extents. If the DRM controller (146) successfully validates the access request, the content decryption key is extracted from the license document to decrypt (370) the DRM restricted content file (142). The resulting content data can be streamed back to the rendering software for final display. The DRM controller may then update the license document to reflect any new state associated with the permitted extents, such as the number plays remaining.

Federated Rights Management

The FRMS relies on a federated network of rights management nodes hosted on centralized systems and secured consumer devices. The ability to offload localized rights management within a consumer's device domain offers a high degree of consumer flexibility with increased rights server performance and scalability.

The federated nodes ensure that only the appropriate devices owned and registered by the end consumer are permitted to have keys that enable the decryption of the content. Once the rights have been purchased from the Central Rights Management Node (410), the local nodes can autonomously perform maintenance of the keys for the consumer's registered devices based on the rights purchased. This reduces the interactions with the central system (410) for performance considerations as well as allows the devices to execute in an untethered model.

The federated model may also support the ability for end consumers to transfer the rights from one account to another if the transport rights have been granted by the rightsholder. The encrypted content may still exist on the original consumers device, however the rights are no longer present as they may be transferred to another federated node.

The federated model may also support devices performing the roll as resellers on behalf of the rightsholders. These trusted devices, such as kiosks or even certain consumer devices, having been granted the rights to resell the content may generate the appropriate keys for another user. During this process, a settlement event may be generated to record the rights transaction.

The federated nodes may also integrate with an embedded rating and balance management system that debits the consumer's device account balance as content is consumed on the devices. The integration also permits the devices to replenish account balances by purchasing additional access rights. An account's balance may be stored on the device as part of the DBR component. However, the FRMS can also store DBR state associated with the rights within the license document. In this case, any balance associated with the rights can also be transferred along with the rights if the key is transferred to another account. Therefore, any balance associated with the rights is consumed even when the rights are transferred, as the state of the rights can be part of the license.

Content providers are free to implement their own encryption technology. They may provide the central rights management node (410) either the associated decryption key or a shared key that may be used to derive the decryption key for individual content files. This key may be stored in a central repository maintained by the Central Rights Provider (CRP) node (410). The CRP (410) extends the responsibilities of the DRM License Server (160). Consumers, generally, have no direct access to the CRP node. In the case where specific content keys are provided to the CRP (410), the Content Provider (120) also provides a unique identifier used to uniquely associate the encrypted content with the appropriate decryption key, such as the file's DOI.

The CRP's (410) responsibility is to collaborate with a Local Rights Provider (LRP) node (420), which extends the responsibilities of the DRM Controller (146). The LRP (420) can be any consumer device, or retail outlet device (such as a kiosk), capable performing the role. It may comprise additional software to support FRMS. This node may have at least transient Internet connectivity and the capability to locally communicate to other consumer devices. Connectivity to other devices can be achieved by any wireless mechanism (i.e., Bluetooth, 802.11) or wired connection (i.e., USB, hardware dongle). The LRP's (420) extended responsibility may primarily manage the production, packaging, and transferring of Federated Digital Rights Keys (FDR Keys). The FDR Key extends the responsibilities of the Rights Document (162).

The CRP (410) node may perform all initial authorization and revenue collection from the end consumers for the rights to the content. Collecting the consideration associated with the granted rights can be delegated to the DBR component on the consumer's device (140). Once the end consumer has purchased the rights, the CRP (410) releases the appropriate key to a LRP management node (420) executing within a secure, registered consumer or retail device. Within the local node, the content decryption key is repackaged and encrypted using keys specific for that account's set of authorized devices. The repackaged FDR Key can then be distributed to the consumers authorized devices to enable the decryption of the content.

Certain trusted LRPs (420) may also perform all of the authorization and revenue collection from another end consumer. The extended trust means that the LRP (420) may be trusted to forward the settlement information generated by the rights transaction. These LRP (420) devices might be kiosks in the mall, or even consumer or retailer devices with resell rights (as granted by the rightsholder) to content. Such LRPs may need the appropriate connectivity to process credit card transactions.

Federated Rights Management Topology

Figure 4:
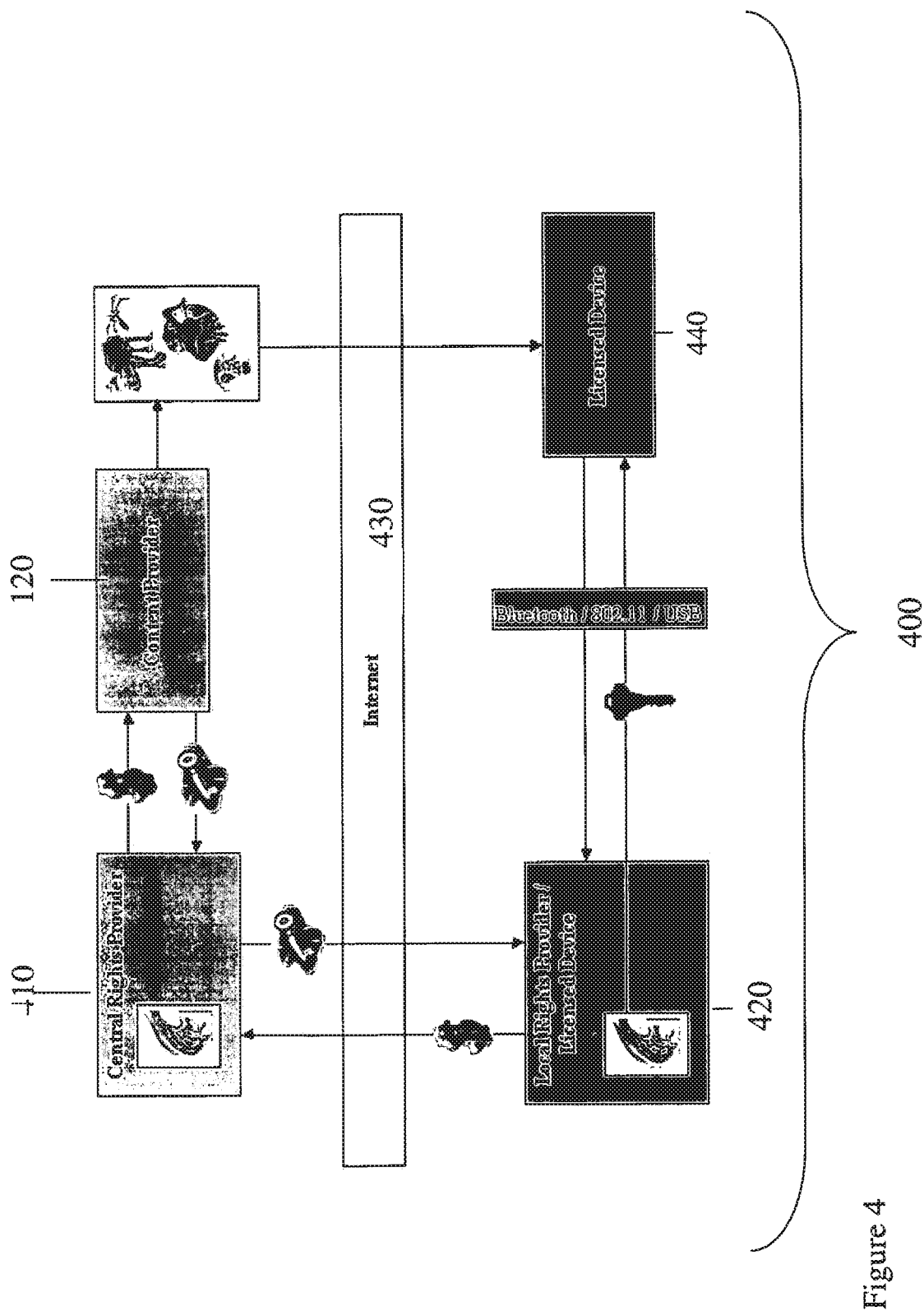
FIG. 4 illustrates the major components of one embodiment of FRMS.

Referring to FIG. 4, the Account Domain is defined as the set of all the account's devices (140) capable of participating in the FRMS that have been registered to the FRMS. A given Account Domain is permitted to include a certain set of Licensed Devices (140) at any given time. The size of the domain can be set by the Content Provider (120) within the Rights being purchased by the consumer. The LRP (420) collaborates with any Licensed Devices (140) within the Account's Domain to create the appropriate FDR Key for those specific devices. Once the key has been produced by the LRP (420), it is only useful to the Licensed Devices (140), defined in the specified Account Domain.

It is likely that the first LRP (420) embodiments could be either consumer personal computers or television set top boxes. These devices typically have connections to the Internet (430) with higher bandwidth. These devices are also currently capable of hosting a trusted platform to perform the secure functions of the FRMS. This does not, however, preclude other types of devices from acting as LRPs.

Digital Rights Management Integration

The FRMS can either be used to extend the abilities of existing DRM systems or fulfill the roll of the DRM system entirely.

In one embodiment, the FRMS can be integrated with existing DRM solutions by managing the distribution of their license documents. In this case, the DRM system on the device calls the FRMS on the device to obtain the license documents. The FRMS process the FDR Key and supplies the existing DRM solution with the license document encased in the FDR Key. The existing DRM system uses the license document as it would normally to grant access and decrypt the content file. In this case, the FRMS is a wrapper around an existing DRM solution that facilitates the management of the consumer license throughout their network of account devices.

In a second embodiment, the FRMS fulfills the role of the local DRM system in addition to the license management role. In this case, the content consumption process (i.e., player, view, CD burner) makes direct requests to the FRMS on the Licensed Device. The FRMS processes the rights document encased in the FDR Key and responds accordingly to the content consumption request. In this case, the LRP fulfills the entire role of the client DRM controller.

Secure Computing Platform

The FRMS may utilize industry standard encryption technologies. The responsibilities of the LRP are preferably secured in any embodiment using smart card technology, dedicated secure chip sets, the emerging Trusted Computing Platform Alliance (TCPA) security features, and equivalents thereof to ensure keys are never passed in the clear.

In order to participate in the network of consumer devices, the device (140) (e.g., players, viewers, CD burners, etc.) may present credentials to the LRP (420) that authenticate its environment.

Digital Rights Key Structure

Figure 5:
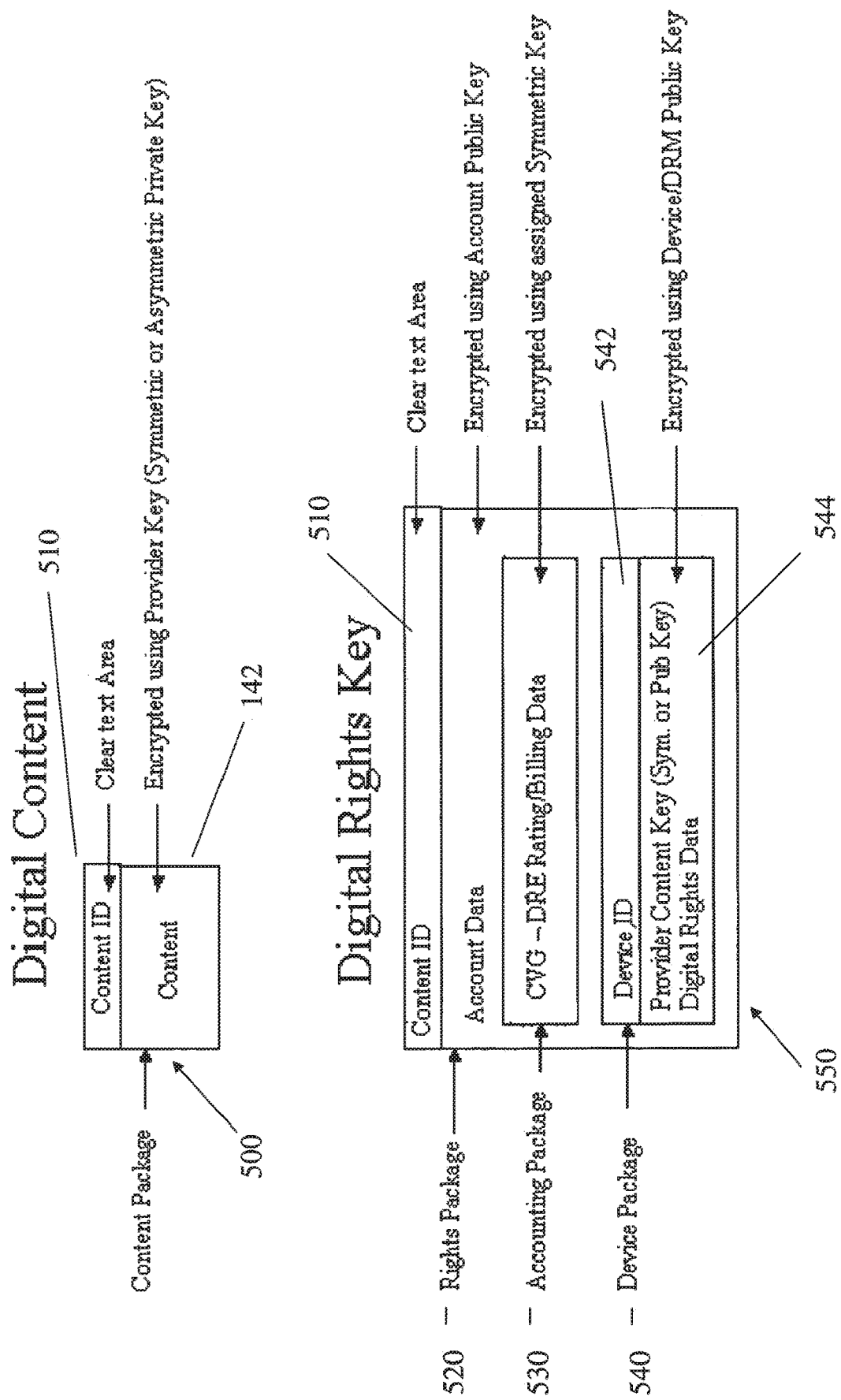
FIG. 5 illustrates the separation of the content package from the rights package in one embodiment of FRMS.

Referring to FIG. 5, various embodiments of the invention may utilize two structures: the Content Package (500) and the Digital Rights Key Package (550). The Content Package (500) comprises of the encrypted content (515) and an associated unique identifier (510) such as a DOI. The Digital Rights Key Package (550) may comprise a number of entities and encryptions to protect and administer the associated digital content.

Content Package (500)

The digital content (142), may be matched with its associated digital rights by the use of a Content ID (510) stored in the header area of the distributed content. The value and structure associated with the Content ID (510) may be opaque to this design. The Content ID (510) may be assigned by the Content Provider (120) and may have meaning to that entity.

The Content ID (510) comprises information necessary to locate the appropriate DRM license server performing the role of CRP (410) where the corresponding decryption key can be purchased. In addition, the Content ID (510) expresses whether a relationship between either a single content entity, or a grouping of content entities. For example, a Content ID might denote that the key is for a single Beatles song, a Beatles album or the entire Beatles anthology.

The Content ID (510) is not encrypted in the header area of the content package. This enables the retrieval of the Content ID (510) without requiring an encryption key. If the Content ID (510) is altered in the content package, either the associated digital rights key will not be found or the provider content key will not match the key required to decrypt the tampered digital content package (142).

In order to complicate the hacking and distribution of digital rights keys, the content provider may distribute many copies of their content, encrypted with many different encryption keys to create a genetic diversity of content. Each instance would have to have a new unique Content ID (510). As the content is redistributed through peer-to-peer networks, these various copies of content are intermixed in the network making it even more difficult to even find the right key to launch an attack against the secured content.

Device Package (540)

The innermost layer of information, the Device Package (540), may be provided by the Content Provider (120). The Device Package (540) comprises a unique Device ID (542) and an encrypted payload. This layer does not have to (although it may) encrypt the Device ID (542), because the outer layer (Rights Package) (520) may encrypt the Device ID (542) as part of the Device Package (540).

The encrypted payload (544) may be encrypted by a public key provided by the device (140) to which the content (142) is licensed. The device (140) retains the private key necessary to decrypt this layer. Each device (140) may provide a Device ID that associates its identity to the keys it provides. In FIG. 5, there can be one to many Device Packages (540) depending on the set of devices (140) licensed under an instance of the FDR Key (910) authorized to access the content (142).

Accounting Package (530)

The Accounting Package (530) may contain information for applying rating and billing algorithms against the instance of digital content (142). The payload may be passed to the Device Based Rating component (DBR) to perform the rating and billing functions. This information may be updated during a rights authorization sequence of events.

The Accounting Package (530) may be encrypted using a symmetrical key assigned to the account. The symmetrical key serves as a shared secret so that an embedded DBR can decrypt and re-encrypt it with updated stateful information.

Account Data

When an FDR Key (910) is transferred, the owning account data within the FDR Key (910) may remain in the transferred key depending on which party maintains the accountability for the content. For example, if the content is allowed to be on loan to another account, the original account is still responsible. The account information may be used to purchase additional rights. If the FRMS performs a reseller role (superdistribution model) and generates a brand new Rights Document, the account information is stripped from the information transmitted to the second account. When the second account's LPR packages its FDR Key (910), it will insert its account data in the key.

The presence of the account data (i.e., consumer's name, credit card information, etc.) in the FDR Key (910) also serves as a deterrent for posting FDR Keys (910) out on the net in an attempt to get someone to crack the key. The first encryption envelope that must be cracked may expose the consumer's account information that originally purchased the key.

Rights Package (520)

The entire digital rights key may be referred to as the Rights Package (520). Each outer layer may encrypt each inner layer for additional security. This package contains the Content ID (510) for associating it with the encrypted content. The payload encompasses the Account Information, Accounting Package and all Device Packages. The payload may be encrypted using the public key assigned to the account. Only devices (140) associated with the same account have access to the required account private key to decrypt the Rights Package payload.

Key Generation

Referring to FIG. 6, this table summarizes the keys used by an embodiment of the FRMS. The table shows, for each key used in the system, when it is created, by what, where the key is provided and the purpose of the key. These keys and methods are exemplary only and could include other varieties.

Content Provider's Role

Content Providers (120) are primarily responsible for the encryption of their content (142) and the unique creation of Content IDs (510). The Content Provider (120) may provide the Central Rights Provider (CRP) (410) either the appropriate decryption keys or the necessary information to resolve the decryption key associated with the Content ID (510). In the latter case, the CRP (410) does not store the decryption key, however this requires a tighter integration between the Content Provider and the CRP. Either method may be supported.

Content Entity

Figure 7:
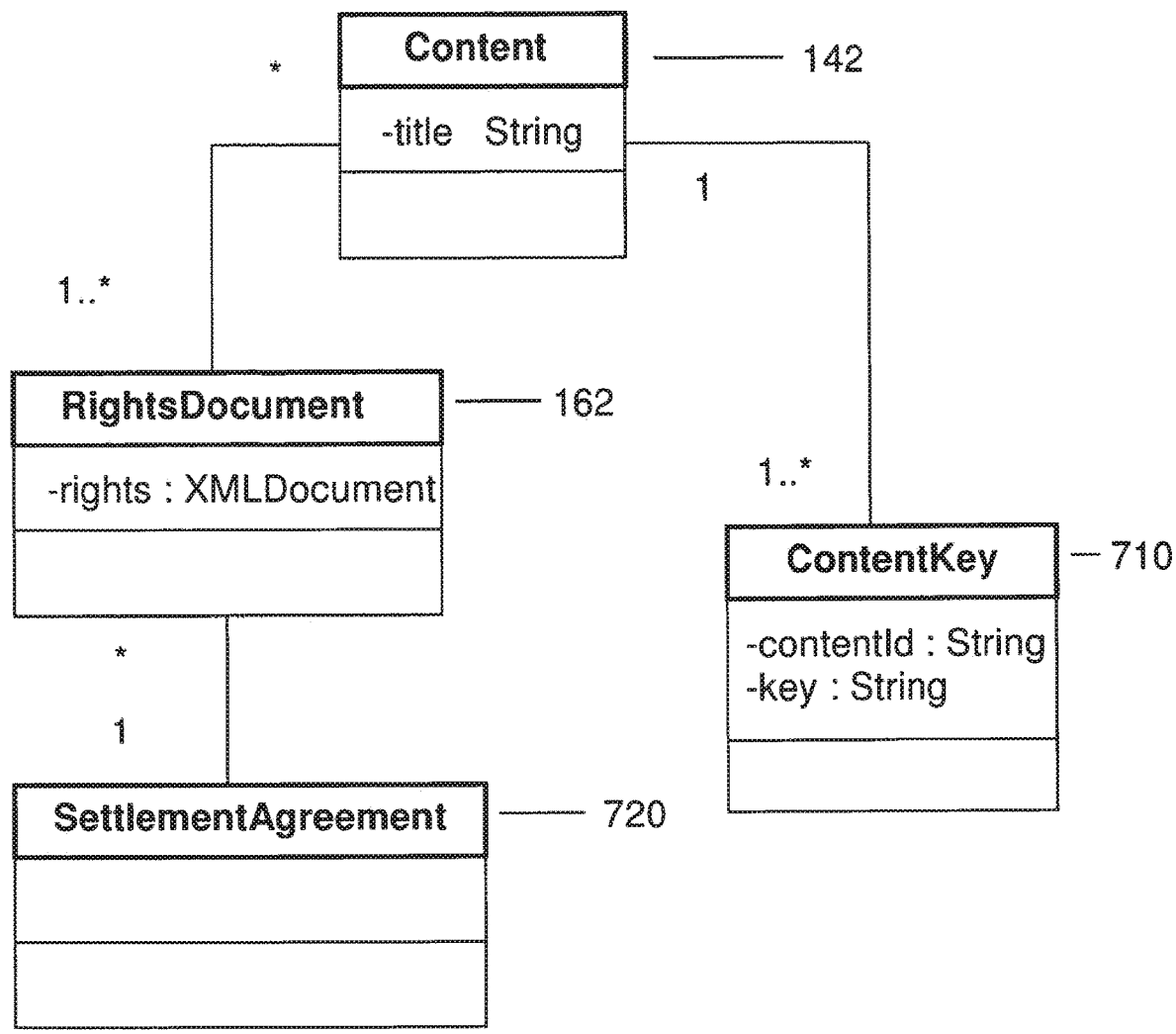
FIG. 7 illustrates the separation of the content package from the rights package in one embodiment of FRMS.

When the Content Provider (120) collaborates with the CRP (410), it may convey the information depicted in FIG. 7. For each uniquely encrypted instance the Content Provider releases to consumers, a Content Key may be sent to the CRP (410) depending on the embodiment for key resolution. The Content Key entities can be added or revoked at any time. For example, the provider might release content that is a movie. The movie is defined by a single Content instance. Whenever the Content Provider (120) encrypts an instance of the movie for distribution with a new encryption key, they can send an instance of the Content Key (120) entity to the CRP (410). It is not necessary that every consumer have a different version of the content encrypted with a unique key.

Rights Document Entity

Each Content entity can have one to many Rights Documents (162) that can be offered to consumers. The Rights Document (162) is supplied by either the Content Provider (120) or the entity managing the CRP (DRM License server) (410), and describes the digital rights being sold to the consumer.

Settlement Agreement Entity (720)

Associated with each Rights Document (162), is the Settlement Agreement (720) used to describe the price or rating price plan for the purchased digital rights. In addition, the Settlement Agreement (720) describes the necessary royalty information for payment settlement. This information is also used to build the appropriate DBR payload (if any) used on the devices (140).

Central Rights Provider's Role (410)

The role of the CRP (410) is primarily to act as the clearinghouse for content decryption keys and as the settlement agent for the FRMS. The CRP (410) may be addressed by all federated nodes and Content Providers (120) and may mediate the purchase and distribution of decryption keys to consumer devices hosting the LRP (420). Once consumers purchase content rights, the CRP (410) performs the settlement of royalties between all interested parties based on the Settlement Arrangement (720) associated with the Rights Document (162) purchased by the consumer. The CRP (410) may also subsequently perform this settlement function based on usage information obtained from the Device Based Rating component on the client device (140).

The CRP (410) also has the governing role of maintaining the FRMS

Certificate Revocation List. A unique PKI certificate and device ID (e.g., serial number) [collectively, Federated Rights Management (FDR) key] identifies each device within the collection of collaborating nodes. When a device is added to an account's list of devices, the CRP (410) may be queried by the LRP (420) to determine if the device (140) is still valid. In the event that fraud is suspected on any device, the device's certificate and/or ID can be added to the revocation list. In this case, the CRP (410) will not authorize the LRP (420) to add the new device (140). From time to time, the CRP (410) may require the LRP (420) to revalidate the list of devices against current revocation lists.

From time to time, the CRP (410) can issue requests to the LRP (420) to dump its current Account and DBR keys, as well as request the generation of new certificates. In the case of new certificate requests, the CRP (410) will accept certification requests from the LRP (420) and have them certified by a Certification of Authority and pass them back to the LRP (420) The LRPs (420) owned by the account would regenerate their FDR Keys based on the new set of keys. As non-LRP devices synchronize with the LRP, they pickup the newly generated FDR Keys. Churning the keys provides an extra level of security and renewability to the keys.

The CRP (410) also may have the responsibility of maintaining the list of valid content the consumer has purchased. These lists may be used primarily for backup and recovery of license information in the event that a consumer's LRP (420) is damaged, lost or stolen. The CRP (410) can refresh a new LRP (420) for the consumer when a new or replacement device is added to the authorized LRP (420) list for the account.

Central Rights Provider (410) Service Interfaces

Figure 8:
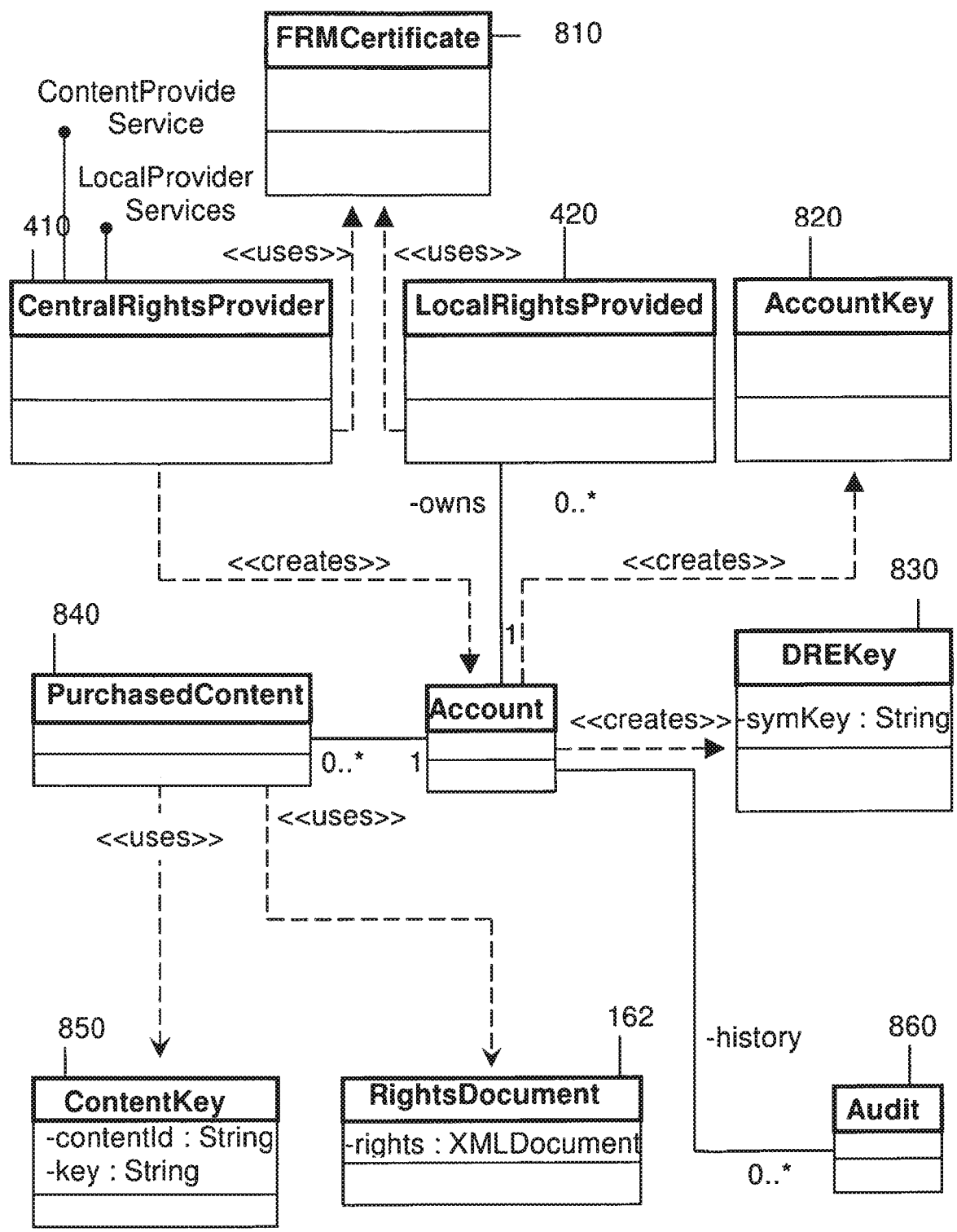
FIG. 8 illustrates a flowchart of an FRMS embodiment.

From the Content Provider's (120) perspective, the CRP (410) exposes an interface of services to maintain the entities depicted in FIG. 8. These services include declaring new content, and potentially adding additional decryption keys for existing content, and updating settlement and rights management documents.

Whenever the Content Provider (120) publishes new content, that content (142) must be defined to the CRP (120). Whenever the Content Provider (120) defines new Content IDs (510), those IDs must be defined to the CRP (410).

From the LRP (420) perspective, the CRP (410) exposes an interface of services to perform such services as purchase new content, maintain a list of LRP devices and maintain the associated Account information. Before the LRP (420) can fully interact with the CRP (410), it may register for the service by creating an Account and declaring its LRP information to uniquely and securely identify itself. Subsequently, the LRP (410) can use the Local Provider Services interface to purchase content.

FRM Certificate Entity

In order to securely collaborate with the LRP (420), CRP (410) should trust the LRP (420). The trust is established with the CRP (410) by providing a Federated Rights Management Certificate (810) to the CRP (410). The LRP (420) may provide a secure processing environment such as a smart card type device to be granted LRP status. In one embodiment, during the fabrication of the secured environment, a FRM PKI key set is generated with the Private key being placed on the device and the public key being provided along with the card ID to create the FRM Certificate (810). A certificate authority signs the FRM Certificate as authentic. The LRP (420) will provide the FRM Certificate (810) to the CRP (410), other LRP's and Account Domain Registered Devices (140) to establish secure communication channels from those devices.

When an LRP (420) first establishes contact with a CRP (410), they may exchange certificates. All communication up to the CRP (410) may be encrypted using the public CRP key. Likewise, all communication down from the CRP may be encrypted by the CRP (410) using the provided LRP (420) public key. The FRM Card ID is passed in the communication as part of the header information and is not encrypted. The FRM Card ID is used to resolve the correct public key to decrypt the message from the LRP (420). If the FRM Card ID cannot be located or the message fails to decrypt the message, the LRP (420) is invalid.

Private Keys are generally available on your own system and accessible by the user because the keys are present for the user's protection. In a preferred embodiment, however, the Private Keys are not for the User's protection but for the FRMS's protection (protecting the rightsholders) so the Private Keys associated with the FDR Certificate are not made available to the end user. Instead, the FRM Private Key is made available to the FRMS owned by the user. Therefore, the user, himself, cannot extract the key, only his unique instance of the FRMS can.

Account Entity

The Account Entity represents the responsible party for digital rights settlement. An Account will typically have a single LRP (420) to manage their purchased content, but may have additional LRPs (420). The CRP (410) can control the number of LRPs (420) any given Account can maintain.

Account Key

Each Account generates keys used to control access for the Federated Digital Rights Keys as well as the DBR system.

The Account Key (820) represents a symmetric key for encrypting Federated Digital Rights Keys (FDR Keys). The key is generated by the CPR (410) and provided to the LRP (420). The LRP (420) will subsequently share the key with other devices that successfully register with the LRP (420) to enable multiple devices associated with the same account to use the FDR Key. Each device will get a copy of the symmetric key so that they can decrypt the FDR Keys and encrypt them again with updated state information as necessary.

Purchased Content Entity (840)

When customers purchase content (142), they are purchasing a certain set of rights to that digital content (142). Those rights are defined in the Rights Document (162). The Rights Document (162), as it existed during the time of the purchase, is associated with the Purchased Content Entity (840). In addition, the Content Key (850) associated with the purchase is associated with the Purchased Content Entity (840). In the event a consumer's device is corrupted, lost or destroyed, the Purchased Content Entity (840) can be used to resolve the correct rights the consumer purchased.

Audit Entity 860)

The Audit Entity (860) associated with the Account Entity provides any historical reference information associated with purchase, usage or payments made by the Account.

Local Rights Provider's Role

Figure 9:
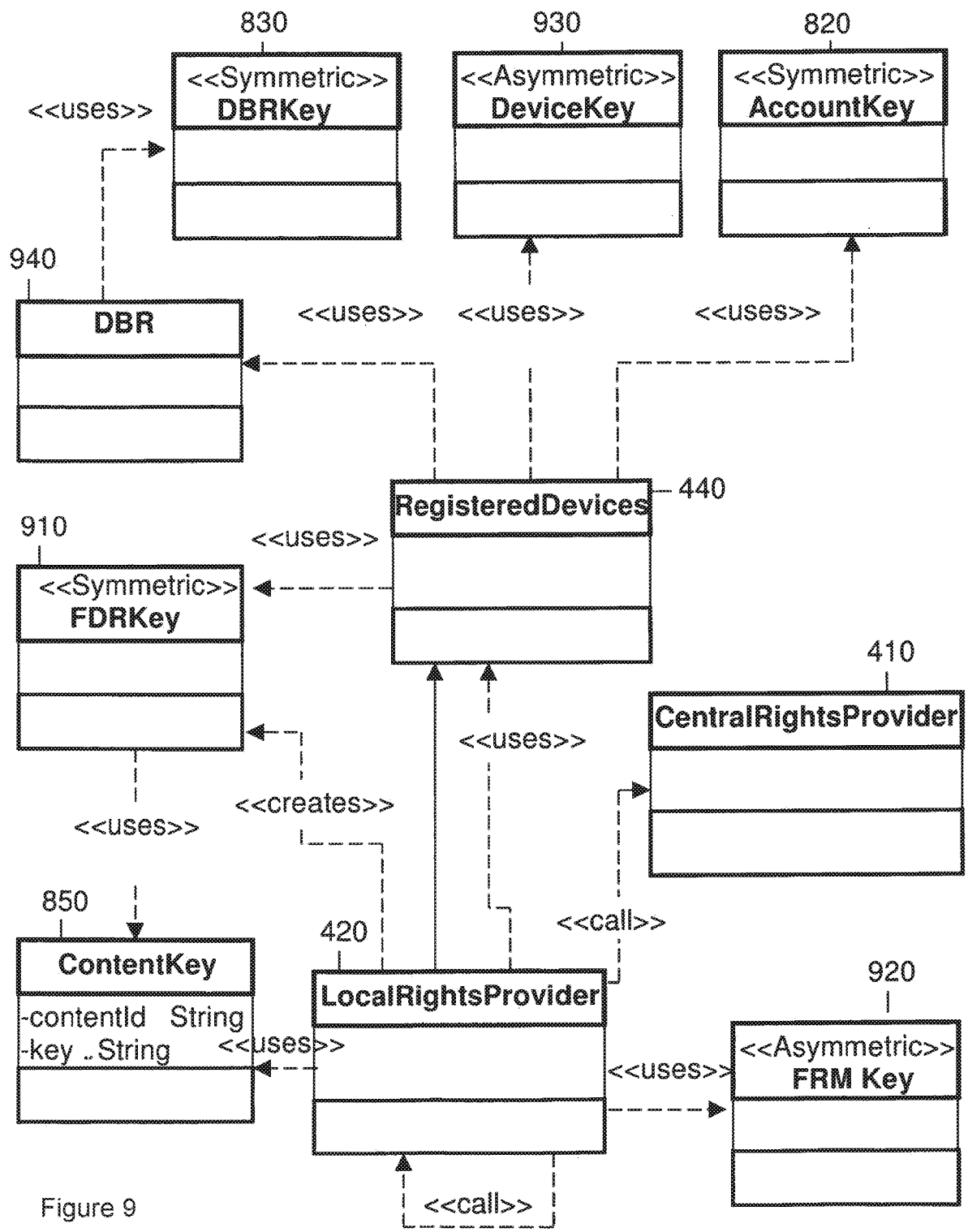
FIG. 9 illustrates another flowchart of an FRMS embodiment.

Referring to FIG. 9, as part of LRP's (420) responsibilities, the LRP (420) may permit other consumer devices (140) to register themselves with the LRP (420). These other devices (140) are referred to later as Registered Devices or non-LRP devices.

The process of transferring digital rights from one LRP (420) may revoke the ability of the original LRP (420) to access the FDR Key (910) and may result in transferring a re-encrypted FDR Key (910) to a second LRP (420) in a foreign Account Domain. The legal right to transfer the Content Rights may be expressed in the Rights Document (162) contained within the FDR Key (910) otherwise transfer requests may be blocked. The LRP (420) could also be used to export FDR Keys (910) into other trusted DRM solutions, as well as import keys from other LRPs (420) or non-LRPs of the same account. These scenarios may be governed by the rights initially granted by the CRP to the original LRP (420).

In order to transfer the rights, the owning LRP may create an intermediate FDR Key using a shared secret established between the two LRPs during a network conversation. The devices start the conversation by exchanging FRM Certificates and verifying those exchanged certificates as authentic. The sending LRP also verifies the security level of the receiving LRP against any constraints specified in the Rights Document (162). For example, the transfer right might only be granted if the receiving device offers a hardware base secure environment. While another device, which only offers a tamper resistant software based solution, is rejected for the transfer based on the security level offered.

The normal FDR Key may be fully decrypted to obtain the individual parts. The intermediate FDR Key may be generated using the session shared secret so that the receiving LRP doesn't require the originating Account's set of encryption keys. Once the receiving LRP obtains the intermediate key, it may decrypt the data with the shared secret and then repackage the FDR Key using its Account, DBR and Device key set.

In order to transfer rights, the Rights Document may require that the LRP prevent the original owner from accessing the content, as in the loan model. The LRP maintains a list of all the devices that have received an FDR Key. If the LRP transfers the FDR Key while these devices maintain their copy, the condition would not have been satisfied. Therefore, the LRP may require those devices to surrender their instances of the FDR Key prior to permitting the transfer of the FDR Key. The LRP can provide the user the list of devices required to surrender. When these devices are networked back to the LRP, the request to delete the FDR Key is sent to the FRMS enabled device. That device removes the FDR Key from its store and replies successfully.

In one embodiment, it would be possible to override this mechanism to support cases where the customer cannot provide the device to surrender the key, such as the device is lost, stolen or broken. In this case, the LRP may permit the transfer but any devices that have not surrendered the key are in effect, black listed from the FRMS system. Those devices could not exchange keys from any of the Account's LRPs until the key has been surrendered. The LRP that black listed the device sends a message the CRP to that effect. The CRP can queue a black list message for each of the Account's registered LRPs.

In one embodiment, if the registered device has not allowed a synchronization within some configurable time (or content access count) duration, the FRMS prohibits access to content until a synchronization has occurred. If the device has any previously reclaimed licenses, they are removed. If the device was lost/stolen by the user and found by another consumer, the device and its content effectively expire without the proper synchronization with the owning LRP. If this becomes a frequent occurrence for an Account, the Account might be flagged for suspected fraud. If this becomes a frequent occurrence for an Account, the Account might be flagged for suspected fraud.

The LRP (420) may also perform the role of reseller for the rightsholder. In this case, the Rights Document (162) associated with the LRP's license allows the resell and would also specify the rights that can be sold. The LRP device (420) collaborates with other FRMS enabled devices to exchange key information to generate the new FDR Key (910). The LRP (420) may generate a settlement record to reflect the rights transactions and synchronizes the record with the CRP, which performs the final settlement. Typically, this type of LRP might be a kiosk type device. However, a consumer's device with Internet connectivity could also perform this role. For example, an LRP enabled cellular phone could resell content to another user's digital player device (e.g., mp3 player). The reselling account might get some type of credits or rebate to compensate for their airtime expense or loyalty.

In another embodiment, assume a superdistribution model where content (142) is encrypted and sold to user A with the render rights to play as well as superdistribution rights to permit the rendering of the content after a percentage of the original retail prices has been sent to the publisher. User B would like to have a copy of the content after meeting user A. User A transmits a copy of the encrypted content (142) over to B's device. User B must still acquire a valid rights document (162) to access the encrypted content. A's rights provide the ability to resell the rights as long as the rightsholder receives X % of the original retail price. The fee charged to user B by user A can be split between user A and the rightsholder. Once settled, A's device can transmit the rights document (162) over to B's device enabling the render right as well the continued superdistribution right. In a true superdistribution model, user B could also act as another agent of the rightsholder just as user A performed in this rights transaction.

The LRP (420) can also import FDR Keys (910) from other devices owned by the same account. These other devices can be either LRP devices or non-LRP devices. This enables content licenses purchased from various sources to be distributed and maintained throughout the consumer's network of devices.

In one embodiment, User A may wish to buy user User B's license (either directly or, perhaps, through an auction website). In this scenario, User B is licensed to "sell"/"give" the license to another user. User B must further permit the reclaim of that license from his network of devices. A safety mechanism may be built into the system to make sure that the user is suitably encouraged to "return" his "sold" licenses. This may be accomplished through the synchronization timer as explained supra. User A and B may agree on a price and settle outside the FRMS. User A may transmit his FRM Certificate to User B's LRP (or the certificate may be transferred by e-mail for importation by User B's LRP) via User A's LRP to perform the "handshake" step. The "master license" may be stripped of User B's particulars (if necessary) and be encrypted with the public key in User A's FRM Certificate. At this point, User B no longer has the rights to the content and may transmit the encrypted master license back to user A. If User A has purchased the content from User B through an auction website or other means, the parties may have already exchanged money to bind the transaction. Alternatively, money could be exchanged later or contemporaneously via the devices if the devices are equipped to handle such. In a further alternative, credits or other files may be "traded" as consideration for the transaction. User A may use his LRP to import the exported master license. User A's FRM Private Key may be used to decrypt exported master license from User B, and generates the appropriate FDR Keys for his devices. That FDR Key can be networked to User A's other device to gain access to the content.

Registered Device

To register, a device networks to an LRP that has already registered with the CRP to establish or link to an Account. The networking can occur over any wireless or wired protocol as the communication is encrypted. Co-location of devices on a secure platform is also possible. The device exchanges credentials that include the FRM Certificates and a Device ID, such as a serial number, with the LRP and verifies the FRM certificate using the Certificate Authority. The LRP may query the CRP by sending the device's credentials to determine if the presented device certificate has been revoked. Once the credentials have been exchanged, the LRP retains the information, which uniquely identifies the registered device. All subsequent communication with the registered device is encrypted using PKI. For performance considerations, a session key can be established for the duration of a conversation where abundant data is transferred.

All of the account's Licensed Devices may support a different level of securing the digital content. When a device registers itself with the LRP, it may also provide its security level. The security level supported by the device is subsequently used to determine if rights should be granted to the device. Content Providers can specify in the Rights Document (162) the level of security required by the devices before content can be enabled on the target device.

Once the new device may be accepted by the LRP, the Account Key and DBR key (if any) may be securely transmitted to the newly Registered Device and securely stored on that device. These keys are required for processing the subsequent FDR Keys transmitted to the newly Registered Device.

When a device attempts to register with an LRP, it may have previously registered with another LRP. If that prior LRP belongs to a foreign Account Domain, the device may be forced to surrender any FDR Key associated with that foreign domain as well as any keys prior to registering with the new Account Domain.

Local Rights Provider

The LRP (420) maintains the list of Registered Devices by allowing new and existing devices to register and unregister. The LRP can impose a configurable limit on the number of Registered Devices. In the event the limit has been reached, the consumer can unregister an old device to drop back below the limit to register another device. The CRP could also direct the LRP to allow additional registered devices as it maintains the policies enforced by the LRP. In order to unregister, a device must surrender their key set from its secure platform store.

The LRP permits the consumer to purchase the rights for content and builds the appropriate Federated Digital Rights Key for the consumer's devices. When content is purchased, the CRP sends the LRP the Content Key necessary for decrypting the purchased content. The LRP then packages the Content Key with the appropriate Registered Device Keys and DRE Key to produce the FDR Key. The FDR can then be transmitted to the associated device.

The LRP maintains a list of purchased content and the FDR Key for that content. A consumer may have purchased content previously, and subsequently purchased an additional device. Once the new device is successfully registered, that device can request a key from the LRP. Instead of going back to the CRP, an additional Federated Digital Rights key can be generated for the new device by using the existing FDR Key maintained by the LRP.

Federated Digital Rights (FDR) Key (910)

The LRP (420) generates the FDR Key (910) by packaging the components of the FDR Key (910) using various encryption keys to secure the contents to specific Accounts and Devices. A structure for this key is discussed in previous sections. The LRP (420) generates one of these keys for a specific device registered to the LRP. The key can then be transmitted to the consumer device and stored along with the associated encrypted digital content.

Device Key (930)

The Device Key (930) is the encryption key necessary to decrypt the device specific package of the FDR Key (910). The key (930) is stored on the device's secure platform. The device key (930) is an FRM PKI key generated along with the device's secure platform. Any given device, an LRP (420) or simple registered Client Device (140), has only one FRM Key (910). The FRM Key (910), in the case of a registered Client Device, (140) is termed a Device Key (930) to help denote its FDR Key (910) processing responsibilities.

The public key is used by the LRP (420) to encrypt the Device Package (540) inside the FDR Key (910), and the associated private key is used by the device's secure platform to decrypt the same package on the device.

DBR

A Device-Based Rating (DBR) component (940) can collaborate in the processing of content requests. The DBR component (940) has the ability to rate content based on varying factors and store balances associated with the content.

The DBR component (940) may access state information stored in the FDR Key (910) such as the number of plays remaining. Any state information stored within the FDR Key (910) is stored in the DBR Package. The DBR component (940) has the ability to locally store its own balance information. However, if the user wishes the DBR state to be ported with the license, then the state may be inserted into the FDR Key (910) as part of the DBR payload. DBRs installed in the various consumer devices may have the ability to decrypt and re-encrypt the state information within the FDR Key as they process events.

A registered device (140) can directly call the DBR (940) or delegate to another DRM component when the FRMS acts as a DRM wrapper. In the case where the registered device (140) directly calls the DBR (940), before the Content Key (850) is released from the FDR Key (910), the device can pass the DBR Payload to the DBR component (940) and ask the DBR if access should be granted. If the DBR responds favorably, the FRM system continues. Otherwise, an appropriate error message is returned from the FRM system.

In order for all devices, across LRPs (420) within the same Account, to have access to the state information, a DBR Key (830) is generated at the Account level and provided to the LRP (420) when they initially register with the CRP (410). The DBR key (830) can either be provided by the DBR Centralized Billing System or generated by the CRP (410). This key is handled in the same secure manner as the Account Key (820) within the LRP (420). The DBR Key is also subsequently passed to registered devices during a successful registration process.

The DBR component (940) may supply its own key (830) to encrypt its FDR Key (910) payload. Any consumer device that will process the FDR Key (910) must have access to the DBR Key (830). The DBR Key (830) can be specific to each Account.

In order for any consumer device to interact with the FRMS, they must have a secure computing component installed that contains the appropriate FRM device side software. Each device maintains a store of FDR Keys that authorize content consumption on that device. The FRMS device side components provide an interface for authenticated DRM and Content Players to obtain the appropriate decryption keys. The DBR Key is also subsequently passed to registered devices during a successful registration process.

Once the device has been successfully registered with the LRP (420), it can collaborate with the LRP (420) to obtain FDR Keys (920) to unlock content. Software executing on the device that renders the content or otherwise requires access to rights for the content, issues a request to the FRMS to gain access to the content. The FRMS on the registered device (140) extracts the Content ID from the request and looks for the associated FDR Key (910) in its local key store. If the key exists, the key is processed and the enclosed decryption key is provided back to the authenticated caller. If the key doesn't exist on the device, the FRMS on the device will attempt to connect to the LRP (420) to request a key. If a connection cannot be established, an error is returned to the caller indicating an FDR Key (910) is required to access the content and the device must be networked, in some way, to the LRP (420). The registered device (140) keeps the request information so the next time the device is networked, the FDR Key (910) request can be processed automatically.

The device may collaborate with other LRPs (420) belonging to different accounts to obtain new FDR Keys (910). During this exchange, temporary keys are generated to provide the foreign LRP with encryption keys to transmit the new key. Some devices may not provide the level of security required to complete this rights transaction and would be prevented by the other LRP (420) from performing this type of transaction. Given the appropriate security level, the device can import the key from another LRP (420) and encrypt the key for local storage. The key is identified as new in the device's key store. The next time the device (140) synchronizes with its LRP (420), the new key is transmitted to the LRP (420) where it can be exchanged with other device if the rights document (162) permits.

Replenishing Rights

The Rights Document (162) associated with the license the consumer initially purchased expresses the type of rights they purchased. Those rights might be a limited use, or may extend only for a fixed duration. When the rights associated with the initial purchase either expire or the user wants to purchase extended rights (e.g., in addition to listening to a song, the consumer wants to burn a copy), the FDR Key (910) may be reissued or replenished.

The initial license contains the consumer's account information necessary to replenish the license from the CRP (410). This information is used by the LRP (420) to connect to the CRP (420) and purchase the updated license. The user can also have the option of providing new payment information. Once purchased, the updated license information is downloaded to the LRP (420). The LRP (420) can then create the appropriate Rights Document (162) with the new rights and balance information.

Limited Reseller Role

The LRP (420) could act, in limited fashion, as a type of reseller for the Content Provider (120). The Rights Document (162) may contain metadata that tells the LRP (420) what activities it may perform when distributing encrypted content. For example, a LRP (420) could be instructed to generate a limited FDR Key (910) for another consumer that allows previews of the content, or limited promotional plays. In this case, not only could the encrypted content be distributed, but access rights for promotional purposes could also be distributed within the same P2P collaboration. The second consumer would still have to use their own LRP/CRP to purchase the full access rights to the content.

Nothing restricts the type of licenses that could be generated and distributed by the LRP except the restriction(s) established in the Rights Document (162). LRP devices may even have the right to perform a full scale resale of the digital content. The LRP could perform the role of a content reseller by generating the appropriate rights document and sending the corresponding settlement information back to the CRP (410). The operator of the LRP (420) would accept and process payment from outside the FRMS.

Proxy

In the proxy case, one node provides the network connectivity for another node to complete a normal FRMS rights transaction. The rights provider might offer bonuses to the proxy node for assisting in the completion of the rights transaction.

For example, two teens, Bob and Steve, wish to complete a transaction. After Steve hears the preview of the songs, he wants to purchase the full rights. Bob knows that the more licenses he proxies, the more bonuses he gets and offers Steve the services of his SmartPhone. The two nodes collaborate so that Steve's content player can talk to Bob's phone, which issues the Internet request on Steve's behalf. Steve's account information is used to settle with the rightsholder. During the transaction, Bob's account that was used to complete the rights transaction is awarded a bonus. The FDR Key is returned to Steve's content player where he can now fully access the content. When Steve returns home, he can import the FDR Key into his Account Domain to network the license to his other devices.

In exchange for reselling the content, in effect acting as a point of sale, the consumer might gain credits or loyalty points. In order to complete a transaction, the consumer's LRP device may be used to connect to the CRP (410) over its Internet connection.

Federated Digital Rights Key Generation

The LRP (420) has the responsibility of generating the final FDR Key (910) and making it available to other registered FRMS devices within the account domain. The LRP (420) can also transfer FDR Keys (910) to other account domains.

The process starts when a registered device makes a request for a FDR Key (910).

If a license does not exist, the LRP (420) must first obtain the rights from the CRP (410) for the content being requested. The content's header may be examined to extract the URL of the CRP (410) acting as the license server. The LRP (420) calls the CRP (410) requesting a license for the content based on the Content ID also obtained from the header. In addition, the LRP (420) may pass additional information to the CRP (410) to complete the financial transaction such as the user's credit card information or license server account information. The message may be digitally signed using the LRP's private key to authenticate the origin of the request.

The CRP (410) receives the request and verifies the LRP's public key certificate. Once authenticated, the CRP (410) can perform the financial transaction to grant the requested rights. The content decryption key may be either retrieved or derived based on the method used by the Content Provider. The content decryption key, the Rights Document (162) that describes the rights purchased and a DBR payload associated with the purchase plan, if any, may be encrypted using the LRP's public key and returned to the LRP (420).

The LRP (420) may decrypt the three artifacts returned from the CRP using its private key. The original encrypted contents may also be stored in the LRP license store (148) on the LRP device for future device processing of subsequent requests. The store also maintains the list of registered devices and which devices have which FDR Keys (910). Another entity which may be maintained in the store is the Account Key (820).

The LRP (420) can also generate an FDR Key (910) that contains multiple valid Device Packages (540), which enables the same FDR Key (910) to be used on multiple devices within the Account's Domain. This provides the ability for a registered device to transmit the FDR Key (910) throughout the network of those valid devices. For example, a consumer has two different FRMS enabled MP3 players and a car audio system. The LRP (420) can generate an FDR Key (910) that is valid on all three devices. The first MP3 is brought into proximity to the LRP device (420) such as the consumer's PC. A Bluetooth connection is made and the FDR Key (910) is transmitted to the MP3 player and stored. The first MP3 player can be used to distribute the FDR Key (910) to the other devices, much like 'beaming' business cards from one PDA to another.

Once the FDR Key (910) has been retrieved, either from the local store or by requesting one from an LRP (420), the FRMS attempts to decrypt the outer package envelope using the Account key (820). If successful, the contents will be an optional encrypted DBR package as well as a set of Device Packages (540). If the DBR package is found, it is decrypted using the DBR key (950) and is then ready to provide to the DBR component (940). The device has a unique ID stored in its secure area along with its FRM Certificate (810). The appropriate Device Package (540) is selected by this ID for decryption using the devices private FDR Key (910). If an appropriate Device Package (540) cannot be located, the content is not valid for the given device.

Once the Device Package (540) is decrypted using the device's private key, the contents are the Rights Document (162) and the content decryption key. This information is either passed to the DRM system being wrapped, or processed by the FRMS acting as the DRM Controller. If the rights being requested are granted, the content file can be decrypted using the content decryption key.

Once the access has been authorized, the DBR component (940) may signal the FRMS that the state information should be updated in the FDR Key (910) through a call back. The DBR provides its updated DBR payload information on the call back function. The FRMS then encrypts the DBR payload using the DBR key. The entire FDR Key (910) is then encrypted using the Account Key (820) and the resulting updated FDR Key (910) is updated in the local store for the next access.

In another embodiment, a consumer may bring their portable content player to a Brick and Mortar (B&M) outlet to load new content. An entire music store can be reduced to a kiosk in the mall. The consumer places their device within Bluetooth range of the kiosk for example, and uses the FRMS kiosk to download the content from the provider's library. The kiosk could also accept a credit card payment from the consumer manually, or through the device. Once payment has been arranged, the FRMS can generate the appropriate FDR Key and transfer them to the consumer's device. The LRP executing in the kiosk then transmits the settlement information back to the CRP for content settlement. Once the consumer returns home, the new keys can be imported back into their network of devices to allow all of their other devices to access the same content files.

This type of rights transaction can also be carried out anonymously. The purchasing device doesn't really need to be associated with a known account, but the FRM Certificate obtained from the device should still be valid.

Device Management

One of the goals for the invention is to create a method and procedure for consumers to manage their own rights licenses within their sphere of devices. For example, the nodes maintain a list of available FDR Keys as well as content on the device that requires FDR Keys. Through Automatic License Synchronization, a device networked to the LRP may acquire the necessary FDR Keys already owned by the consumer, installed on that device without user interaction.

Initial Setup

The initial installation of the FRMS software will vary based on the type of secure platform offered by the device. The invention is not specifically tied to a secure platform, and will leverage the ever increasing secure environment capabilities as they expand. Therefore, how the devices are initially setup will vary based on the security offered and will evolve over time with the capabilities of the secure platforms.

In one embodiment, on early devices without a hardware based secure solution, state of the art Tamper Resistant Software (TRS) methodologies must be employed to secure the software. In these cases, the software can be downloaded and installed on the device. Prior to download, the software would be genetically altered by the TRS to create a unique installation and set of encryption keys secured within the software. As an alternative to download, the typical software packaging could be sold at retail outlets and installed by the consumer. If TRS is the only solution, as with any secure solution the risks associated a compromise must be evaluated. Any TRS solution should employ a white-box approach to mitigate a debugger attack against the software.

In another embodiment, the software and encryption keys are installed on secure chip sets during the manufacturing of the device, or the device supports a smart card reader interface that can accept a manufactured smart card. This method imposes a burden on the device manufacture and potentially product development timing issues. However at this time, an internal chip is the preferred solution for small devices to eliminate the consumer's interaction with the device setup and losing the smart card. The FRMS software would still have to either integrate with the DRM solution or have the capability to establish trust with the various requestors of content (e.g., rendering software) outside the control of the smart card/chip.

In the preferred embodiment, the device provides a TCPA type environment where the software can be installed post-production. The TCPA environment provides a mechanism to determine the trust level of the device before the software is installed. The environment is also preferred as a runtime environment.

Lost Devices

In the event a consumer loses an FRMS device, they can use their LRP, or even a CRP interacting website, to identify the device as lost or stolen. The device's certificate may be then registered under the revoked certificate list. If the device is found and networked to the original accounts LRP, the non-LRP device count may be verified and all FDR Keys resynchronized. If the non-LRP device level has been exceeded, the device may be cleared of its FDR Keys and account level encryption keys.

If the device is networked to another LRP not owned by the original account, the LRP rejects the non-LRP device until it has been cleared. Devices should provide a way to clear or reset the FRMS system, such as a menu option or press a button for 10 seconds. The reset process deletes all FDR Keys and encryption information. Another alternative is to register the device as stolen to the CRP. If the CRP maintained the list, when the device is registered under another account, the CRP provider can be alerted. This might be an extra service offered by the CRP provider to track stolen devices.

If a consumer "loses" devices too frequently, the CRP may identify the account for fraud evaluation.

Sold Devices

When a consumer sells a device (e.g., garage sale), they may remove the device from their Account Domain prior to selling the device. This will permit the transfer (sell/load) of keys, if necessary, to other consumers. The FRMS remembers where the FDR Keys have been transmitted within the Account Domain. The transfer (sell/loan) of FDR keys may trigger a condition which prompts the CRP to demand that all federated keys be returned to the CRP and churned for redistribution. Otherwise, the new owner's LRP will see the device as belonging to another Account Domain and may reject the connection just as described under the Lost Device section. The device should be reset prior to joining the new user's Account Domain.

Back in the seller's sphere of devices, the count of devices is only decremented if they clear the device from their domain prior to selling the device. However, if they fail to do so and subsequently hit the device limit, they must use either the LRP or CRP (in the case of selling an LRP) to denote the device as sold.

If the consumer performs this pattern too often, the CRP may identify the account for fraud evaluation.

Local Key Management

One of the goals for the invention is to provide for the easy management of the user's digital rights throughout their sphere of devices. The Automatic License Synchronization and a CRP license backup discussed in this section address this goal.

Automatic License Synchronization

The LRP maintains a list of valid FDR Keys, and therefore implicitly the content the consumer has purchased. Each non-LRP device maintains a list of FDR Keys available on the device for DRM decryption. As the consumer loads new content onto the device, the licenses may or may not be available on their LRP.

A device may inform the FRMS system when the new content has been installed on the device by providing the Content ID to the FRMS. By doing so, the FRMS can add the Content ID to a list of requested FDR Key during the next device synchronization. This list is normally formed when the consumer attempts to access protected content on the device and the FDR Key is not found. During the next synchronization, the keys in this list are requested from the LRP. If permitted by the rights document, the appropriate FDR Keys are generated and sent to the device for storage.

Repository Backup

The consumer's LRP knows the available FDR Keys valid for the consumer's non-LRP devices. If the non-LRP device is reset by accident, the LRP can restore the non-LRP's FDR Key s.

The CRP knows the valid Content IDs purchased by the account. In the event the consumer's LRP is reset by accident, the CRP can restore the list of valid FDR Keys on the LPR.

What is claimed:

1. A system for managing distribution of digital content, the system comprising:
- a first electronic rights provider server;
- a second electronic rights provider server; and
- one or more electronic media devices;

wherein the first electronic rights provider server is configured to:
- create an electronic master license, the electronic master license to grant to the second electronic rights provider server a right to create at least one child license;
- transmit the electronic master license to the second electronic rights provider server; and
- maintain a revocation list of electronic media devices, each electronic media device included in the revocation list identified by a respective identifier and a respective set of security credentials;

the second electronic rights provider server intermediary to the first electronic rights provider server and the one or more electronic media devices and including one or more processors configured to:
- receive the electronic master license from the first electronic rights provider server;
- create at least one child license for a set of digital content associated with said master license within a set of parameters defined by said master license;
- receive, from the one or more electronic media devices, an identifier and a set of security credentials;
- determine, by querying the first electronic rights provider service, that the one or more electronic media devices is not identified in the revocation list;
- register the one or more electronic media devices responsive to determining that the one or more electronic media devices is not identified in the revocation list;
- establish, responsive to registering, an account domain comprising the one or more electronic media devices associated with a consumer;
- create a unique account key for each electronic media device of the one or more electronic media devices in the established account domain;
- transmit, to each electronic media device of the one or more electronic media devices in the established account domain, the respective unique account key;
- receive a request for digital content of the set of digital content from a first electronic media device not in the established account domain of;
- receive a first identifier and a first set of security credentials from the first electronic media device;
- register the first electronic media device responsive to receiving the first identifier and the first set of security credentials;
- add the first electronic media device to the account domain;
- create a child license of the at least one child license for the digital content of the set of digital content associated with the master license according to the request from the first electronic media device and within the set of parameters dictated by said master license;
- combine at least the child license of the at least one child license, a set of account charge data associated with the first electronic media device to be used to process a charge associated with the request, and the digital content in a digital rights package;
- encrypt the digital rights package by using the account key corresponding to the first electronic media device;
- transmit, via the network, the encrypted digital rights package to the first electronic media device;
- process the charge associated with the request for the digital content from the first electronic media device using said account charge data associated with the first electronic media device; and
- settle a generated settlement record with a corresponding record of the first electronic rights provider server by transmitting, via the network, responsive to processing the charge, a set of settlement data of the charge to the first electronic rights provider server;

the one or more electronic media devices configured to:
- transmit, to the second electronic rights provider server, the identifier and the set of security credentials;
- register, with the second electronic rights provider server the one or more electronic media devices to be associated with the consumer;
- decrypt the digital rights package responsive to receiving the unique account key and the encrypted digital rights package from the second electronic rights provider server.

2. A method for managing distribution of digital content comprising:
- creating an electronic master license by a first electronic rights provider server, the electronic master license configured to grant to a second electronic rights provider server a right to create least one child license;
- receiving, by one or more processors of the second electronic rights provider server intermediary to the first electronic rights provider server and one or more electronic media devices, the master license to create at least one child license for a set of digital content associated with said master license within a set of parameters defined by said master license;
- receiving, by the one or more processors, from the one or more electronic media devices, an identifier and a set of security credentials;
- determining, by the one or more processors querying the first electronic rights provider service, that the one or more electronic media devices is not identified in a revocation list maintained by the first electronic rights provider;
- registering, by the one or more processors, the one or more electronic media devices responsive to determining that the one or more electronic media devices is not identified in the revocation list;
- establishing, by the one or more processors, responsive to registering, an account domain comprising the one or more electronic media devices associated with a consumer;
- creating, by the one or more processors, a unique account key for a first electronic media device of the one or more electronic media devices in the established account domain;
- transmitting, by the one or more processors, via the network, to the first electronic media device, the unique account key;
- receiving, by the one or more processors, from the first electronic media device, a request for digital content of the set of digital content;
- creating, by the one or more processors, a child license of the at least one child license for the digital content of the set of digital content associated with the master license according to the request from the first electronic media device and within the set of parameters dictated by said master license;

combining, by the one or more processors, at least the child license of the at least one child license, the set of account charge data associated with the first electronic media device to be used to process a charge associated with the request, and the digital content in a digital rights package;

encrypting, by the one or more processors, the digital rights package by using the account key corresponding to the first electronic media device;

transmitting, by the one or more processors, via the network, the encrypted digital rights package to the first electronic media device;

decrypting, by the first electronic media device, the encrypted digital rights package responsive to receiving the unique account key and the encrypted digital rights package from the second electronic rights provider server;

processing, by the one or more processors, the charge associated with the request for the digital content from the first electronic media device using said account charge data associated with the first electronic media device; and settling, by the one or more processors, a generated settlement record with a corresponding record of the first electronic rights provider server by transmitting via the network, responsive to processing the charge, a set of settlement data of the charge to the first electronic rights provider server.

* * * * *